(12) United States Patent
Marchisio

(10) Patent No.: US 6,862,710 B1
(45) Date of Patent: Mar. 1, 2005

(54) INTERNET NAVIGATION USING SOFT HYPERLINKS

(75) Inventor: Giovanni B. Marchisio, Kirkland, WA (US)

(73) Assignee: Insightful Corporation, Seattle, WA (US)

(*) Notice: Subject to any disclaimer, the term of this patent is extended or adjusted under 35 U.S.C. 154(b) by 0 days.

(21) Appl. No.: 09/533,884

(22) Filed: Mar. 22, 2000

Related U.S. Application Data

(60) Provisional application No. 60/125,714, filed on Mar. 23, 1999.

(51) Int. Cl.[7] .......................... G06F 17/30; G06F 17/00; G06F 17/16; G06F 17/15; G06F 17/21
(52) U.S. Cl. ...................... 715/501.1; 715/513; 707/3; 707/10; 704/8; 704/9; 345/700
(58) Field of Search ................ 715/501.1, 513; 707/1, 3, 5, 10, 7; 704/8, 9; 345/700

(56) References Cited

U.S. PATENT DOCUMENTS

| | | | | |
|---|---|---|---|---|
| 4,839,853 A | | 6/1989 | Deerwester et al. ........ 364/900 |
| 5,301,109 A | | 4/1994 | Landauer et al. ...... 364/419.19 |
| 5,317,507 A | | 5/1994 | Gallant .................. 364/419.13 |
| 5,325,298 A | | 6/1994 | Gallant .................. 364/419.19 |
| 5,619,709 A | | 4/1997 | Caid et al. .................. 395/794 |
| 5,794,178 A | | 8/1998 | Caid et al. ...................... 704/9 |
| 5,848,417 A | * | 12/1998 | Shoji et al. ................. 707/102 |
| 5,857,179 A | | 1/1999 | Vaithyanathan et al. ........ 707/2 |
| 5,950,189 A | | 9/1999 | Cohen et al. ................... 707/3 |
| 5,982,370 A | * | 11/1999 | Kamper ....................... 345/760 |
| 6,006,221 A | | 12/1999 | Liddy et al. .................... 707/5 |
| 6,006,225 A | * | 12/1999 | Bowman et al. ............... 707/5 |
| 6,026,388 A | | 2/2000 | Liddy et al. .................... 707/1 |
| 6,064,951 A | | 5/2000 | Park et al. ...................... 704/8 |
| 6,122,647 A | * | 9/2000 | Horowitz et al. ........... 715/513 |
| 6,192,360 B1 | | 2/2001 | Dumais et al. ................. 707/6 |
| 6,510,406 B1 | * | 1/2003 | Marchisio ....................... 704/9 |
| 6,598,047 B1 | * | 7/2003 | Russell et al. .................. 707/5 |
| 6,615,208 B1 | * | 9/2003 | Behrens et al. ................ 707/5 |
| 6,678,679 B1 | * | 1/2004 | Bradford ........................ 707/5 |

OTHER PUBLICATIONS

Littman et al., "Automatic Cross–Language Information Retrieval Using Latent Semantic Indexing," pp. 1–11, Oct. 7, 1996.

* cited by examiner

*Primary Examiner*—Joseph Feild
*Assistant Examiner*—Adam L. Basehoar
(74) *Attorney, Agent, or Firm*—Seed IP Law Group PLLC

(57) ABSTRACT

A system for internet navigation using soft hyperlinks is disclosed, in connection with an illustrative information retrieval system with which it may be used. The navigation tool provides freedom to move through a collection of electronic documents independent of any hyperlink which has been inserted within an HTML page. A user can click on any term in a document page, not only those that are hyperlinked. For example, when a user clicks on an initial word within the document, the disclosed system employs a search engine in the background to retrieve a list of related terms. In an illustrative embodiment, a compass-like display appears with pointers indicating the first four terms returned by the search engine. These returned terms have the highest degree of correlation with the initial search term in a lexical knowledge base that the search engine constructs automatically. The disclosed system allows the user to move from the current document to one of a number of document lists which cover different associations between the initial word clicked on by the user and other terms extracted from within the retrieved list of related terms. The disclosed system may further allow the user to move to a document that is considered most related to the initial word clicked on by the user, or to a list of documents that are relevant to a phrase or paragraph selection indicated by the user within the current page.

61 Claims, 13 Drawing Sheets

| | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|
| comedy | 3 | 0 | 0 | 0 | 3 | 0 | 3 | 3 | 3 | 3 | 3 | 0 | 0 | 0 | 3 |
| theatre | 5 | 0 | 0 | 0 | 5 | 0 | 5 | 5 | 5 | 5 | 5 | 0 | 0 | 0 | 5 |
| Shakespeare | 0 | 0 | 0 | 0 | 0 | 0 | 3 | 1 | 0 | 0 | 4 | 0 | 0 | 0 | 0 |
| Tempest | 1 | 0 | 0 | 0 | 0 | 0 | 1 | 1 | 1 | 1 | 1 | 0 | 1 | 0 | 1 |
| playwright | 1 | 0 | 0 | 1 | 0 | 1 | 1 | 1 | 1 | 1 | 1 | 1 | 0 | 0 | 0 |
| London | 1 | 0 | 1 | 1 | 0 | 0 | 1 | 0 | 0 | 0 | 1 | 1 | 0 | 0 | 0 |
| ocean | 0 | 0 | 0 | 1 | 0 | 0 | 0 | 0 | 0 | 1 | 0 | 1 | 1 | 0 | 0 |
| Thames | 0 | 0 | 1 | 1 | 0 | 0 | 0 | 0 | 0 | 0 | 0 | 1 | 1 | 0 | 0 |
| tea | 0 | 0 | 0 | 0 | 0 | 1 | 0 | 0 | 0 | 0 | 0 | 1 | 0 | 1 | 0 |
| bridge | 0 | 0 | 0 | 0 | 0 | 0 | 0 | 0 | 0 | 0 | 0 | 0 | 0 | 0 | 0 |
| knight | 0 | 1 | 0 | 0 | 0 | 0 | 0 | 0 | 0 | 1 | 0 | 0 | 0 | 1 | 0 |
| Agincourt | 1 | 1 | 0 | 0 | 0 | 0 | 1 | 0 | 1 | 0 | 1 | 0 | 0 | 0 | 0 |
| sword | 0 | 1 | 0 | 0 | 0 | 0 | 0 | 0 | 0 | 0 | 0 | 0 | 0 | 0 | 0 |
| armour | 0 | 1 | 0 | 0 | 0 | 1 | 0 | 0 | 0 | 0 | 0 | 0 | 0 | 1 | 0 |
| gate | 0 | 0 | 0 | 0 | 0 | 0 | 0 | 0 | 0 | 0 | 0 | 0 | 0 | 1 | 0 |
| pennants | 0 | 1 | 0 | 0 | 0 | 0 | 0 | 0 | 0 | 0 | 0 | 0 | 0 | 0 | 0 |

INTERNET NAVIGATION USING SOFT HYPERLINKS

CROSS REFERENCE TO RELATED APPLICATIONS

This application claims priority under 35 U.S.C. §119(e) to provisional patent application serial No. 60/125,714 filed Mar. 23, 1999.

STATEMENT REGARDING FEDERALLY SPONSORED RESEARCH OR DEVELOPMENT

The development of this invention was supported at least in part by the United States Defense Advanced Research Project Agency (DARPA) in connection with Small Business Innovation Research Contract DAAH01-99-C-R162. Accordingly, the United States Government may have certain rights in the present invention.

BACKGROUND OF THE INVENTION

The present invention relates generally to user interfaces for searching document sets, and more specifically to a graphical user interface (GUI) for navigating the Internet.

Many existing systems have been developed to enable a user to navigate through a set of documents, in order to find one or more of those documents which are particularly relevant to that user's immediate needs. For example, HyperTextMark-Up Language (HTML) permits web page designers to construct a web page that includes one or more "hyperlinks" (also sometimes referred to as "hot links"), which allow a user to "click-through" from a first web page to other, different web pages. Each hyperlink is associated with a portion of the web page, which is typically displayed in some predetermined fashion indicating that it is associated with a hyperlink.

While hyperlinks do provide users with some limited number of links to other web pages, their associations to the other web pages are fixed, and cannot dynamically reflect the state of the overall web with regard to the terms that they are associated with. Moreover, because the number of hyperlinks within a given web page is limited, when a user desires to obtain information regarding a term, phrase or paragraph that is not associated with a hyperlink, the user must employ another technique. One such existing technique is the search engine.

Search engines enable a user to search the World Wide Web ("Web") for documents related to a search query provided by the user. Typical search engines operate through a Web Browser interface. Search engines generally require the user to enter a search query, which is then compared with entries in an "index" describing the occurrence of terms in a set of documents that have been previously analyzed, for example by a program referred to sometimes as a "web spider". Entry of such a search query requires the user to provide terms that have the highest relevance to the user as part of the search query. However, a user generally must refine his or her search query multiple times using ordinary search engines, responding to the search results from each successive search. Such repeated searching is time consuming, and the format of the terms within each submitted query may also require the user to provide logical operators in a non-natural language format to express his or her search.

For the above reasons, it would be desirable to have a system for navigating through a document set, such as the Web, which allows a user to freely search for documents related to terms, phrases or paragraphs within a web page without relying on hyperlinks within the web page. The system should further provide a more convenient technique for internet navigation than is currently provided by existing search engine interfaces.

BRIEF SUMMARY OF THE INVENTION

In accordance with the present invention, a method and a system for navigating the internet are disclosed, which address the above discussed shortcomings, as well as other deficiencies of existing Internet navigation techniques. The disclosed navigation tool provides freedom to move through a collection of electronic documents independent of any hyperlink which has been inserted within an HTML page. Accordingly, a user can click on any term in a document page, not only those that are hyperlinked. For example, when a user clicks on an initial word within the document, the disclosed system employs a search engine in the background to retrieve a list of related terms. In an illustrative embodiment, a compass-like display appears with pointers indicating the first four terms returned by the search engine. These returned terms have the highest degree of correlation with the initial search term in a lexical knowledge base that the search engine constructs automatically. The disclosed system allows the user to move from the current document to one of a number of document lists which cover different associations between the initial word clicked on by the user and other terms extracted from within the retrieved list of related terms. The disclosed system may further allow the user to move to a document that is considered most related to the initial word clicked on by the user, or to a list of documents that are relevant to a phrase or paragraph selection indicated by the user within the current page.

In this way the disclosed system provides ease and freedom of navigation without the complexities of existing search engine interfaces, and without relying on predefined hyperlinks within a web page. Those skilled in the art will recognize that while the present invention is disclosed with reference to various embodiments used to navigate the Internet, the invention is broadly applicable to a variety of information retrieval applications, which may or may not involve or operate in connection with the Internet.

BRIEF DESCRIPTION OF THE SEVERAL VIEWS OF THE DRAWING

The invention will be more fully understood by reference to the following detailed description of the invention in conjunction with the drawings, of which:

FIG. 4 shows an example of an information (or term-document) matrix;

FIG. 11 illustrates an embodiment of a search engine GUI for providing direct and latent information in response to a query;

DETAILED DESCRIPTION OF THE INVENTION

Figure 1:
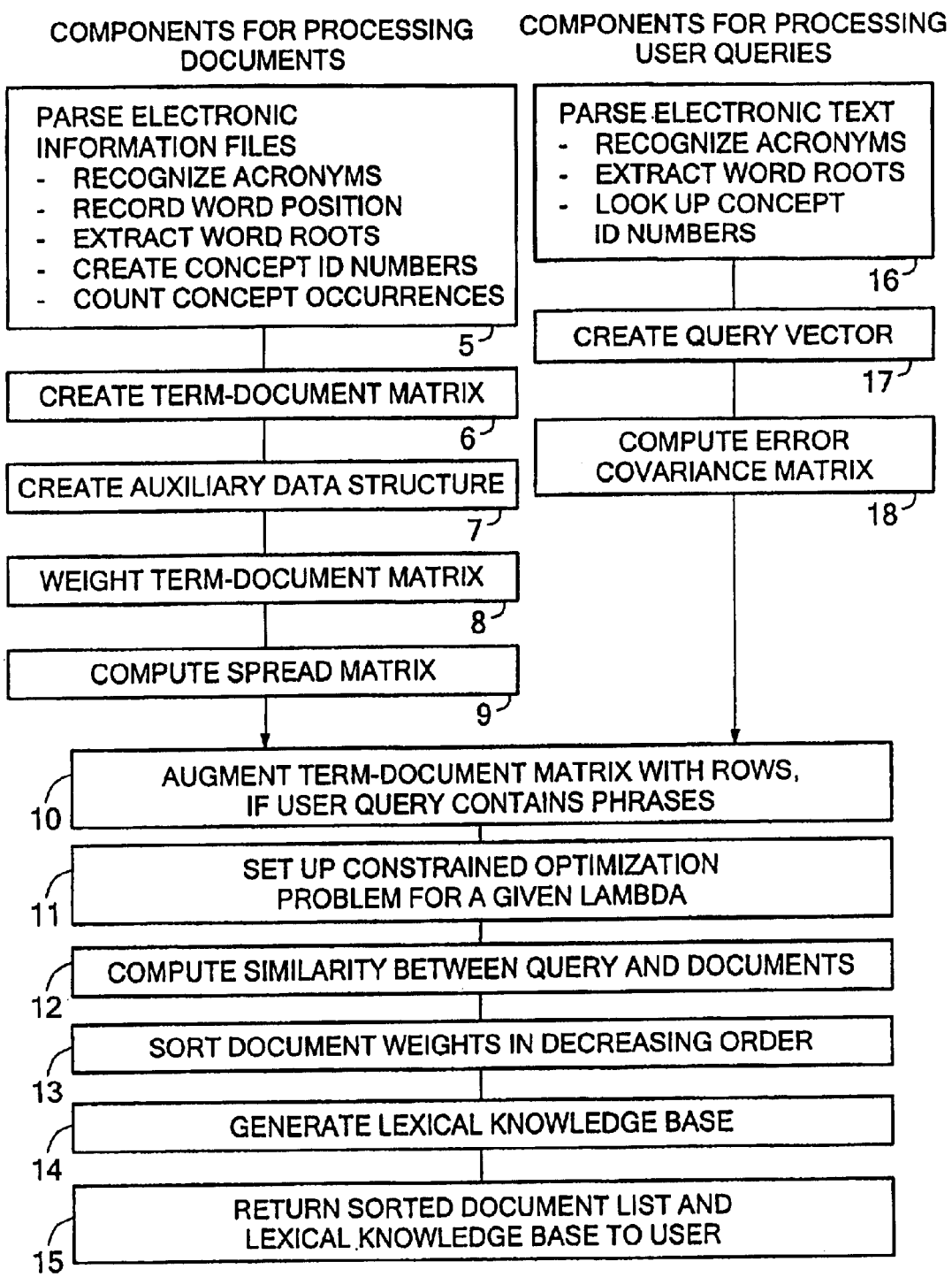
FIG. 1 is a flow chart showing a series of steps for processing documents and processing user queries.

The disclosure of provisional patent application serial No. 60/125,704 filed Mar. 23, 1999 is hereby incorporated by reference.

Information Retrieval Overview

Information retrieval is the process of comparing document content with information need. Currently, most commercially available information retrieval engines are based on two simple but robust metrics: exact matching or the vector space model. In response to an input query, exact-match systems partition the set of documents in the collection into those documents that match the query and those that do not. The logic used in exact-match systems typically involves Boolean operators, and accordingly is very rigid: the presence or absence of a single term in a document is sufficient for retrieval or rejection of that document. In its simplest form, the exact-match model does not incorporate term weights. The exact-match model generally assumes that all documents containing the exact term(s) found in the query are equally useful. Information retrieval researchers have proposed various revisions and extensions to the basic exact-match model. In particular, the "fuzzy-set" retrieval model (Lopresti and Zhou, 1996, No. 21 in Appendix A) introduces term weights so that documents can be ranked in decreasing order relative to the frequency of occurrence of those weighted terms.

The vector space model (Salton, 1983, No. 30 in Appendix A) views documents and queries as vectors in a high-dimensional vector space, where each dimension corresponds to a possible document feature. The vector elements may be binary, as in the exact-match model, but they are usually taken to be term weights which assign "importance" values to the terms within the query or document. The term weights are usually normalized. The similarity between a given query and a document to which it is compared is considered to be the distance between the query and document vectors. The cosine similarity measure is used most frequently for this purpose. It is the normal inner product between vector elements:

$$\cos(q, D_i) = \frac{w_q \cdot w_{d_i}}{\|w_q\|\|w_{d_i}\|} = \frac{\sum_{j=1}^{p} w_{q_j} w_{d_{ij}}}{\sqrt{\sum_{j=1}^{p} w_{q_j}^2 \sum_{j=1}^{p} w_{d_{ij}}^2}}$$

where q is the input query, $D_i$ is a column in term-document matrix, $w_{qj}$ is the weight assigned to term j in the query, $w_{dj}$ is the weight assigned to term j in document i. This similarity function gives a value of 0 when the document and query have no terms in common and a value of 1 when their vectors are identical. The vector space model ranks the documents based on their "closeness" to a query. The disadvantages of the vector space model are the assumed independence of the terms and the lack of a theoretical justification for the use of the cosine metric to measure similarity. Notice, in particular, that the cosine measure is 1 only if $w_{qj}=w_{dj}$. This is very unlikely to happen in any search, however, because of the different meanings that the weights w often assume in the contexts of a query and a document index. In fact, the weights in the document vector are an expression of some statistical measure, like the absolute frequency of occurrence of each term within a document, whereas the weights in the query vector reflect the relative importance of the terms in the query, as perceived by the user.

For any given search query, the document that is in fact the best match for the actual information needs of the user may employ synonyms for key concepts, instead of the specific keywords entered by the user. This problem of "synonymy" may result in a low similarity measure between the search query and the best match article using the cosine metric. Further, terms in the search query have meanings in the context of the search query which are not related to their meanings within individual ones of the documents being searched. This problem of "polysemy" may result in relatively high similarity measures for articles that are in fact not relevant to the information needs of the user providing the search query, when the cosine metric is employed.

Some of the most innovative search engines on the World Wide Web exploit data mining techniques to derive implicit information from link and traffic patterns. For instance, Google and CLEVER analyze the "link matrix" (hyperlink structure) of the Web. In these models, the weight of the result rankings depends on the frequency and authority of the links pointing to a page. Other information retrieval models track user's preferences through collaborative filtering, such as technology provided by Firefly Network, Inc., LikeMinds, Inc., Net Perceptions, Inc., and Alexa Internet, or employ a database of prior relevance judgements, such as technology provided by Ask Jeeves, Inc. The Direct Hit search engine offers a solution based on popularity tracking, and looks superficially like collaborative filtering (Werbach, 1999, No. 34 in Appendix A). Whereas collaborative filtering identifies clusters of associations within groups, Direct Hit passively aggregates implicit user relevance judgements around a topic. The InQuery system (Broglio et al, 1994, No. 8 in Appendix A; Rajashekar and Croft, 1995, No. 29 in Appendix A) uses Bayesian networks to describe how text and queries should be modified to identify relevant documents. InQuery focuses on automatic analysis and enhancement of queries, rather than on in-depth analysis of the documents in the database.

While many of the above techniques improve search results based on previous user's preferences, none attempts to interpret word meaning or overcome the fundamental problems of synonymy, polysemy and search by concept. These are addressed by expert systems consisting of electronic thesauri and lexical knowledge bases. The design of a lexical knowledge base in existing systems requires the involvement of a large teams of experts. It entails manual concept classification, choice of categories, and careful organization of categories into hierarchies (Bateman et al, 1990, No. 3 in Appendix A; Bouad et al, 1995, No. 7 in Appendix A; Guarino, 1997, No. 14 in Appendix A; Lenat and Guha, 1990, No. 20 in Appendix A; Mahesh, 1996, No. 23 in Appendix A; Miller, 1990, No. 25 in Appendix A; Mahesh et al, 1999, No. 24 in Appendix A; Vogel, 1997 and 1998, Nos. 31 and 32 in Appendix A). In addition, lexical knowledge bases require careful tuning and customization to different domains. Because they try to fit a preconceived logical structure to a collection of documents, lexical knowledge bases typically fail to deal effectively with heterogeneous collections such as the Web. By contrast, the approach known as Latent Semantic Indexing (LSI) uses a data driven solution to the problem of lexical categorization in order to deduce and extract common themes from the data at hand.

LSI and Multivariate Analysis

Latent Semantic Analysis (LSA) is a promising departure from traditional models. The method attempts to provide intelligent agents with a process of semantic acquisition. Researchers at Bellcore (Deerwester et al, 1990, No. 10 in Appendix A, U.S. Pat. No. 4,839,853; Berry et al, 1995, No. 5 in Appendix A; Dumais, 1991, No. 11 in Appendix A; Dumais et al, 1998, No. 12 in Appendix A) have disclosed a computationally intensive algorithm known as Latent Semantic Indexing (LSI). This is an unsupervised classification technique based on Singular Value Decomposition (SVD). Cognitive scientists have shown that the performance of LSI on multiple-choice vocabulary and domain knowledge tests emulates expert essay evaluations (Foltz et al, 1998, No. 13 in Appendix A; Landauer and Dumais, 1997, No. 16 in Appendix A; Landauer et al., 1997, 1998a and 1998b, Nos. 17, 18 and 19 in Appendix A; Wolfe et al, 1998, No. 36 in Appendix A). LSI tries to overcome the problems of query and document matching by using statistically derived conceptual indices instead of individual terms for retrieval. LSI assumes that there is some underlying or latent structure in term usage. This structure is partially obscured through variability in the individual term attributes which are extracted from a document or used in the query. A truncated singular value decomposition (SVD) is used to estimate the structure in word usage across documents. Following Berry et al (1995), No. 5 in Appendix A, let D be a m×n term-document or information matrix with m>n, where each element $d_{ij}$ is some statistical indicator (binary, term frequency or Inverse Document Frequency (IDF) weights—more complex statistical measures of term distribution could be supported) of the occurrence of term i in a particular document j, and let q be the input query. LSI approximates D as $$D'=U_k \Lambda_k V_k^T$$

where $\Lambda = \text{diag}(\lambda_1, \ldots, \lambda_k)$, and $\{\lambda_i, i=1,k\}$ are the first k ordered singular values of D, and the columns of $U_k$ and $V_k$ are the first k orthonormal eigenvectors associated with $DD^T$ and $D^T D$ respectively. The weighted left orthogonal matrix provides a transform operator for both documents (columns of D') and q:

$$V_k^T = (\Lambda^{-1} U^T)_k D'$$

$$\alpha = (\Lambda^{-1} U^T)_k q \quad (1)$$

The cosine metric is then employed to measure the similarity between the transformed query $\alpha$ and the transformed document vectors (rows of $V_k$) in the reduced k-dimensional space.

Computing SVD indices for large document collections may be problematic. Berry et al (1995), No. 5 in Appendix A, report 18 hours of CPU time on a SUN SPARC 10 workstation for the computation of the first 200 largest singular values of a 90,000 terms by 70,000 document matrix. Whenever terms or documents are added, two alternatives exist: folding-in new documents or recomputing the SVD. The process of folding-in documents exploits the previous decomposition, but does not maintain the orthogonality of the transform space, leading to a progressive deterioration in performance. Dumais (1991), No. 11 in Appendix A, and O'Brien (1994), No. 26 in Appendix A, have proposed SVD updating techniques. These are still computationally intensive, and certainly unsuitable for real-time indexing of databases that change frequently. No fast updating alternative has been proposed for the case when documents are removed.

Bartell et al. (1996), No. 2 in Appendix A, have shown that LSI is an optimal special case of multidimensional scaling. The aim of all indexing schemes which are based on multivariate analysis or unsupervised classification methods is to automate the process of clustering and linking of documents by topic. An expensive precursor was the method of repertory hypergrids, which requires expert rating of knowledge chunks against a number of discriminant traits (Boose, 1985, No. 6 in Appendix A; Waltz and Pollack, 1985, No. 33 in Appendix A; Bernstein et al., 1991, No. 4 in Appendix A; Madigan et al, 1995, No. 22 in Appendix A). Unfortunately, experience with automated techniques has shown that the user cannot readily associate transform axes with semantic meaning. In particular, open statistical issues in LSI are: (i) determining how many eigenvectors one should retain in the truncated expansion for the indices; (ii) determining subspaces in which latent semantic information can be linked with query keywords; (iii) efficiently comparing queries to documents (i.e., finding near neighbors in high-dimension spaces); (iv) incorporating relevance feedback from the user and other constraints.

The Disclosed System for Information Retrieval

As illustrated by the steps shown in FIG. 1, the disclosed system computes a constrained measure of the similarity between a query vector and all documents in a term-document matrix. More specifically, at step 5 of FIG. 1, the disclosed information retrieval system parses a number of electronic information files containing text. In an illustrative embodiment, the parsing of the electronic text at step 5 of FIG. 1 may include recognizing acronyms, recording word positions, and extracting word roots. Moreover, the parsing of step 5 may include processing of tag information associated with HTML and XML files, in the case where any of the electronic information files are in HTML or XML format. The parsing of the electronic information files performed at step 5 may further include generating a number of concept identification numbers (concept IDs) corresponding to respective terms (also referred to as "keywords") to be associated with the rows of the term-document matrix formed at step 6. The disclosed system may also count the occurrences of individual terms in each of the electronic information files at step 5.

At step 6 of FIG. 1, the disclosed system generates a term-document matrix (also referred to as "information matrix") based on the contents of the electronic document files parsed at step 5. In one embodiment, the value of each cell in the term-document matrix generated at step 6 indicates the number of occurrences of the respective term indicated by the row of the cell, within the respective one of the electronic information files indicated by the column of the cell. Alternatively, the values of the cells in the term-document matrix may reflect the presence or absence of the respective term in the respective electronic information file.

At step 7 of FIG. 1, the disclosed system generates an auxiliary data structure associated with the previously generated concept identification numbers. The elements of the auxiliary data structure generated during step 7 are used to store the relative positions of each term of the term-document matrix within the electronic information files in which the term occurs. Additionally, the auxiliary data structure may be used to store the relative positions of tag information from the electronic information files, such as date information, that may be contained in the headers of any HTML and XML files.

Weighting of the term-document matrix formed at step 6 may be performed as illustrated at step 8 of FIG. 1. Weighting of the elements of the term-document matrix performed at step 8 may reflect absolute term frequency count, or any of several other measures of term distributions that combine local weighting of a matrix element with a global entropy weight for a term across the document collection, such as inverse document frequency.

At step 9 of FIG. 1, the disclosed system generates, in response to the term-document matrix generated at step 6, a term-spread matrix. The term-spread matrix generated at step 9 is a weighted autocorrelation of the term-document matrix generated at step 6, indicating the amount of variation in term usage, for each term, across the set of electronic information files. The term-spread matrix generated at step 9 is also indicative of the extent to which the terms in the electronic information files are correlated.

At step 16, the disclosed system receives a user query from a user, consisting of a list of keywords or phrases. The disclosed system parses the electronic text included in the received user query at step 16. The parsing of the electronic text performed at step 16 may include, for example, recognizing acronyms, extracting word roots, and looking up those previously generated concept ID numbers corresponding to individual terms in the query. In step 17, in response to the user query received in step 16, the disclosed system generates a user query vector having as many elements as the number of rows in the term-spread matrix generated at step 9.

Following creation of the query vector at step 17, at step 18 the disclosed system generates, in response to the user query vector, an error-covariance matrix. The error-covariance matrix generated at step 18 reflects an expected degree of uncertainty in the initial choice of terms by the user, and contained within the user query.

At step 10, in the event that the user query includes at least one phrase, the disclosed system augments the term-document matrix with an additional row for each phrase included in the user query. For purposes herein, a "phrase" is considered to be a contiguous sequence of terms. Specifically, at step 10, for each phrase in the user query, the disclosed system adds a new row to the term-document matrix, where each cell in the new row contains the frequency of occurrence of the phrase within the respective electronic information file, as determined by the frequencies of occurrence of individual terms composing the phrase and the proximity of such concepts, as determined by their relative positions in the electronic information files, as indicated by the elements of the auxiliary data structure. In this way the auxiliary data structure permits reforming of the term-document matrix to include rows corresponding to phrases in the user query for the purposes of processing that query. Rows added to the term-document matrix for handling of phrases in a user query are removed after the user query has been processed.

Following step 10, at step 11, the disclosed system formulates, in response to the term spread matrix, error covariance matrix, and user query vector, a constrained optimization problem. The choice of a lambda value for the constrained optimization problem set up in step 11 is a Lagrange multiplier, and its specific value determines a trade-off between the degree of fit and the stability of all possible solutions to the constrained optimization problem.

At step 12 of FIG. 1, the disclosed system computes the similarity between each of the electronic information files and the user query by solving the constrained optimization problem formulated in step 11. Specifically, in an illustrative embodiment, the disclosed system generates a solution vector consisting of a plurality of solution weights ("document weights"). The document weights in the solution vector each correspond to a respective one of the electronic information files, and reflect the degree of correlation of the user query to the respective electronic information file. At step 13, the disclosed system sorts the document weights based on a predetermined ordering, such as in decreasing order of similarity to the user query.

At step 14, the disclosed system automatically builds a lexical knowledge base responsive to the solution of the constrained optimization problem computed at step 12. Specifically, at step 14, the original term-document matrix created at step 6 and potentially weighted at step 8, rather than the term spread matrix computed at step 9, is cross-multiplied with the unsorted document weights generated at step 12 (note that the document weights must be unsorted in this step to match the original order of columns in the term-document matrix) to form a plurality of term weights, one for each term. These term weights reflect the degree of correlation of the terms in the lexical knowledge base to the terms in the user query.

At step 15, the disclosed system returns a list of documents corresponding to the sorted document weights generated at step 13, and the lexical knowledge base generated at step 14, to the user.

Figure 2:
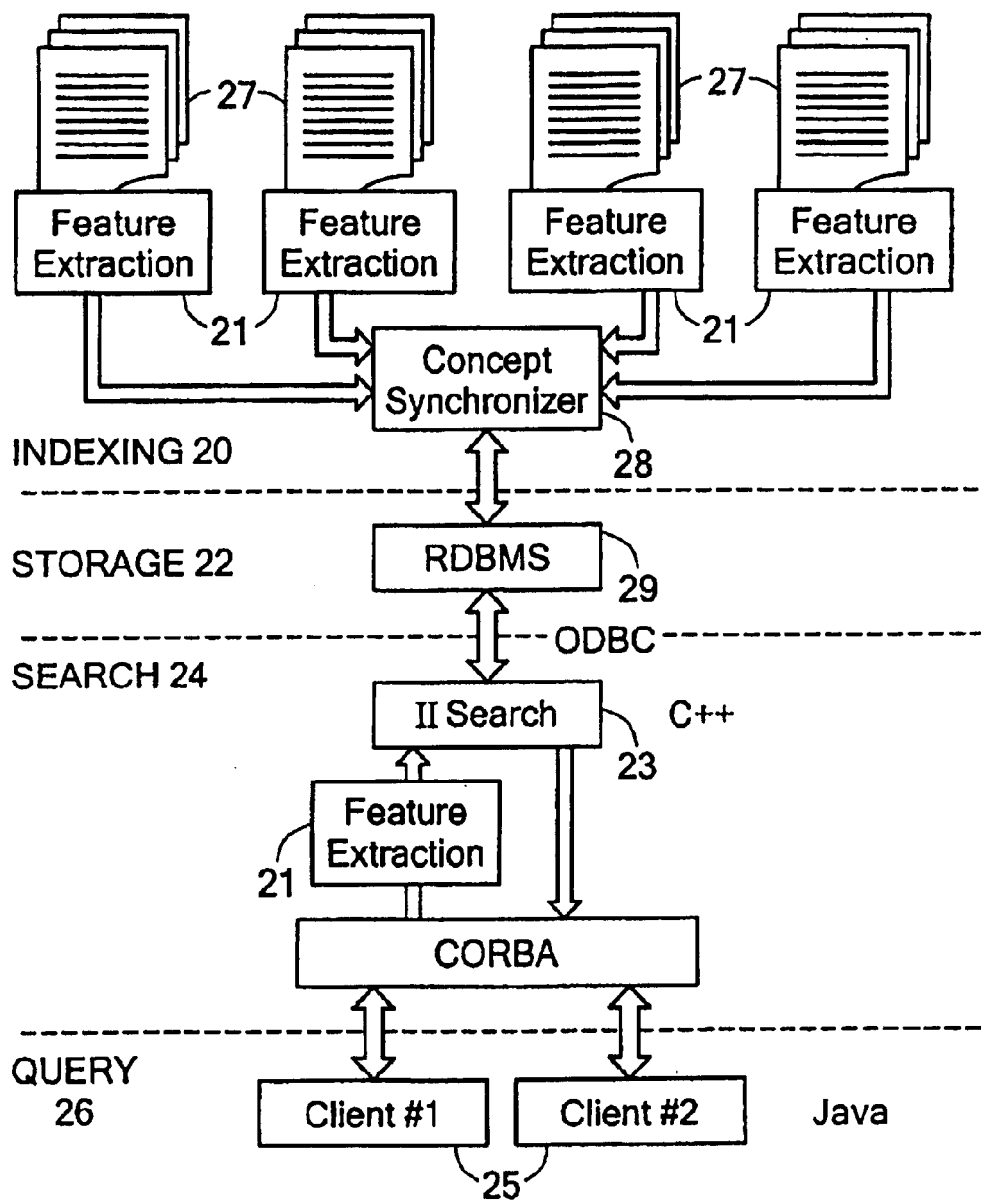
FIG. 2 shows an architectural view of components in an illustrative embodiment.

Overall System Architecture of an Illustrative Embodiment of the Disclosed System for Information Retrieval FIG. 2 shows the overall architecture of the distributed information retrieval system. The system consists of four modules: Indexing 20, Storage 22, Search 24, and Query 26. The modules may run in different address spaces on one computer or on different computers that are linked via a network using CORBA (Common Object Request Broker Architecture). Within this distributed object framework, each server is wrapped as a distributed object which can be accessed by remote clients via method invocations. Multiple instances of the feature extraction modules 21 can run in parallel on different machines, and database storage can be spread across multiple platforms.

The disclosed system may be highly modularized, thus allowing a variety of configurations and embodiments. For example, the feature extraction modules 21 in the indexing module 20 may be run on inexpensive parallel systems of machines, like Beowulf clusters of Celeron PCs, and Clusters of Workstations (COW) technology consisting of dual processor SUN Ultra 60 systems. In one embodiment, the entire architecture of FIG. 2 may be deployed across an Intranet, with the "inverse inference" search engine 23 residing on a Sun Ultra 60 server and multiple GUI clients 25 on Unix and Windows platforms. Alternatively, the disclosed system may be deployed entirely on a laptop computer executing the Windows operating system of Microsoft Corporation.

Further as illustrated in FIG. 2, the indexing module 20 performs steps to reduce the original documents 27 and a query received from one of the clients 21 into symbolic form (i.e. a term-document matrix and a query vector, respectively). The steps performed by the indexing module 20 can be run in batch mode (when indexing a large collection of documents for the first time or updating the indices) or on-line (when processing query tokens). The disclosed architecture allows extensibility of the indexing module 20 to media other than electronic text.

The storage module 22 shown in FIG. 2 includes a Relational DataBase Management System (RDBMS) 29, for storing the term-document matrix. A search engine module 23 implements the presently disclosed inverse inference search technique. These functions provide infrastructures to search, cluster data, and establish conceptual links across the entire document database.

Client GUIs (Graphical User Interfaces) 25 permits users to pose queries, browse query results, and inspect documents. In an illustrative embodiment, GUI components may be written in the Java programming language provided by Sun Microsystems, using the standard JDK 1.1 and accompanying Swing Set. Various visual interface modules may be employed in connection with the GUI clients 25, for example executing in connection with the Sun Solaris operating system of Sun Microsystems, or in connection with the Windows NT, Windows 95, or Windows 98 operating systems of Microsoft Corporation.

Indexing

Figure 3:
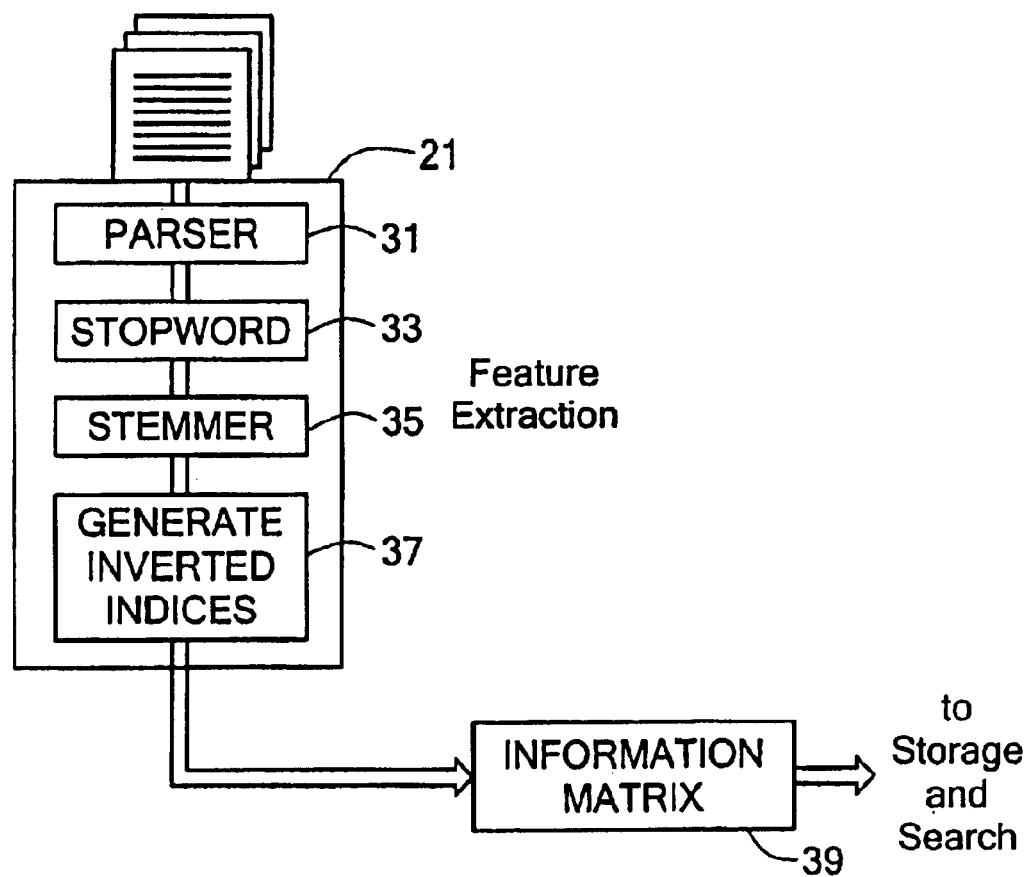
FIG. 3 shows steps performed during feature extraction and information matrix (term-document matrix) formation.

As shown in FIG. 3, a feature extraction module 21 comprises a parser module 31, a stopwording module 33, a stemming module 35, and a module for generating inverted indices 37. The output of the indexing process using the feature extraction module 21 includes a number of inverted files (Hartman et al, 1992, No. 15 in Appendix A), shown as the "term-document" or "information" matrix 39. The parser 31 removes punctuation and records relative word order. In addition, the parser 31 employs a set of rules to detect acronyms before they go through the stopword 33 and stemmer 35 modules. The parser 31 can also recognize specific HTML, SGML and XML tags. The stopword 33 uses a list of non-diagnostic English terms. For purposes of example, the stemmer 35 is based on the Porter algorithm (described in Harman et al, 1992, No. 15 in Appendix A). Those skilled in the art should recognize that alternative embodiments of the disclosed system may employ stemming methods based on successor variety. The feature extraction module provides functions 37 that generate the inverted indices by transposing individual document statistics into a term-document matrix 39.

The indexing performed in the embodiment shown in FIG. 3 also supports indexing of document attributes. Examples of document attributes are HTML, SGML or XML document tags, like date, author, source. Each document attributes is allocated a private row for entry in the term-document matrix. As noted above, weighting of the elements of the term-document matrix 39 may reflect absolute term frequency count, binary count, or any of several other measures of term distributions that combine local weighting of a matrix element with a global entropy weight for a term across the document collection, such as inverse document frequency. In an illustrative embodiment, high precision recall results are obtained with the following weighting scheme for an element $d_{ik}$ of the term-document matrix:

$$w_{ik} = \frac{tf_{ik} \cdot idf_k}{\sqrt{\sum_{k=1}^{n}(tf_{ik})^2(idf_k)^2}} \text{ where } idf_k = \log\left(\frac{N}{n_k}\right)$$

$tf_{ik}$ is the frequency of term k in a document i, while the inverse document frequency of a term, $idf_k$, is the log of the ratio of the total number of documents in the collection to the number of documents containing that term. As shown above, $w_{ik}$ is the weighting applied to the value in cell ik of the term-document matrix. The effect of these weightings is to normalize the statistics of term frequency counts. This step weights the term frequency counts according to: 1) the length of the document in which the term occurs and 2) how common the term is across documents. To illustrate the significance of this weighting step with regard to document length, consider a term equal to the word "Clinton". An electronic text document that is a 300 page thesis on Cuban-American relationships may, for example, have 35 counts of this term, while a 2 page biographical article on Bill Clinton may have 15 counts. Normalizing keyword counts by the total number of words in a document prevents the 300 pages thesis to be prioritized over the biographical article for the user query "Bill Clinton". To illustrate the significance of this weighting step with regard to commonness of certain terms, consider the terms "the" and "astronaut". The former term likely occurs in 1000 documents out of 1000; the latter term may occur in 3 documents out of 1000. The weighting step prevents over-emphasis of terms that have a high probability of occurring everywhere.

Storage

As previously mentioned, the storage module 22 of FIG. 2 includes a Relational DataBase Management System (RDBMS) 29 for storing the information matrix 39 (also referred to as the "term-document" matrix) output by the indexing module 20. In a preferred embodiment, the interface between the RDBMS and the Indexing and Search modules complies with OBDC standards, making the storage module vendor independent. In one embodiment, the Enterprise Edition of Oracle 8.1.5 on Sun Solaris may be employed. However, those skilled in the art will recognize that a database management system is not an essential component of the disclosed invention. For example, in another embodiment a file system may be employed for this purpose, instead of a RDBMS.

The concept synchronizer 28 is used by a parallelized implementation of the indexing module. In such an implementation, at indexing time, multiple processors parse and index electronic text files in parallel. The concept synchronizer 28 maintains a look up table of concept identification numbers, so that when one processor encounters a keyword which has already been assigned a concept identification number by another processor, the same concept identification number is used, instead of creating a new one. In this way, the concept synchronizer 28 prevents having more than one row for the same term in the term-document matrix.

Search

The search engine 23 is based on a data driven inductive learning model, of which LSI is an example (Berry et al, 1995, No. 5 in Appendix A; Landauer and Dumais, 1997. No. 16 in Appendix A). Within this class of models, the disclosed system provides distinct advantages with regard to: 1) mathematical procedure; 2) precision of the search; 3) speed of computations and 4) scalability to large information matrices. The disclosed system attempts to overcome the problems of existing systems related to synonymy and polysemy using a data driven approach. In other words, instead of using a lexical knowledge base built manually by experts, the disclosed system builds one automatically from the observed statistical distribution of terms and word co-occurrences in the document database.

FIG. 4 shows an example of a term-document matrix 40, and also illustrates some of the difficulties associated with existing systems. The term-document matrix 40 of FIG. 4 is shown, for purposes of illustration, loaded with word counts for 16 keyword terms (rows 42) in 15 documents (columns 44). The example of FIG. 4 illustrates testing of latent semantic retrieval. Topics present in document collection of FIG. 4 are "GEOGRAPHY" (documents b3, b4, b6 and b12), "THEATER" (b1, b5, b8, b9, b10, and b15), and "SHAKESPEARE" (b7 and b11). The keyword "Shakespeare" appears only in documents b7 and b11. The documents semantically related to the "THEATER" topic, however, may also be relevant to a search query which includes the single keyword "Shakespeare".

Figure 5:
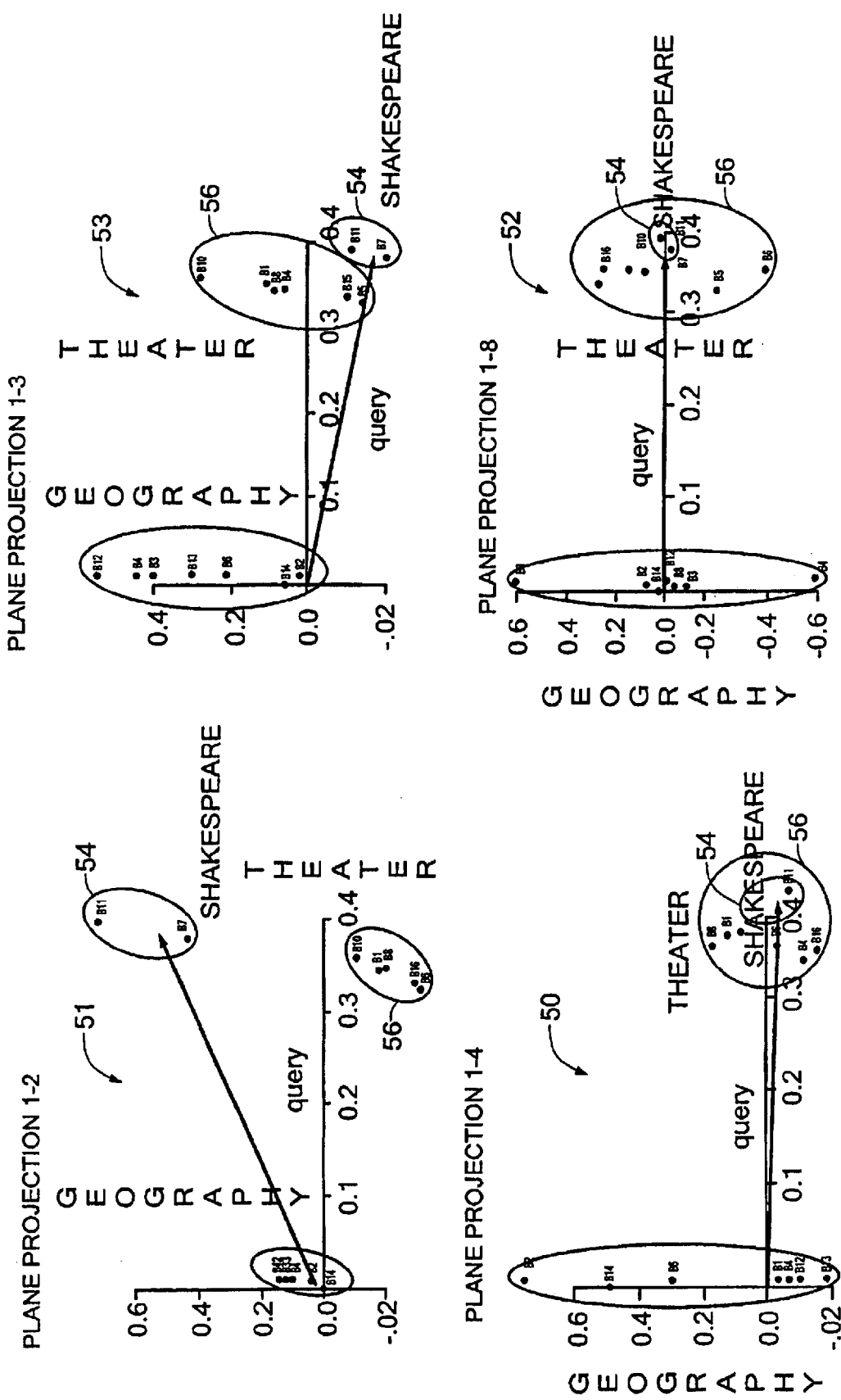
FIG. 5 shows an example of clustering documents represented by the term-document matrix of FIG. 4, and illustrates some of the difficulties of performing document clustering using LSI.

FIG. 5 shows clustering for the document collection reflected by the table of FIG. 4, as obtained using an LSI approach, as in some existing systems. The dots in each of the graphs in FIG. 5 are plane projections of individual documents into "concept space", as determined by a choice of the first few eigenvectors. Documents which deal with similar topics cluster together in this space. The key to successful semantic retrieval is to select a subspace where documents 54 which contain the keyword "Shakespeare" cluster as a subset of all documents 56 which deal with the topic of "THEATER". This is the case for the two projections shown by the graphs 50 and 52, but not for graphs 51 and 53. Graphs 51 and 53 in FIG. 5 are examples where the "SHAKESPEARE" documents 54 do not appear as a subcluster of the "THEATER" documents 56. Graphs 50 and 52, on the other hand, are examples where the "SHAKESPEARE" documents 54 appear as a subcluster of the "THEATER" documents 56. It is difficult to predetermine which choice of projection axes x-y that will cause the desired effect of clustering the "SHAKESPEARE" documents as a subcluster of the "THEATER" documents. More specifically, it is difficult to predetermine how many eigenvectors—and which ones—one should use with LSI in order to achieve this result. FIG. 5 illustrates that there is no way of pre-determining the combination of axes which cause the "SHAKESPEARE" documents to appear as a subcluster of the "THEATER" documents.

LSI and Matrix Decomposition

The SVD employed by the LSI technique of equation (1) above provides a special solution to the overdetermined decomposition problem $$D=\Psi A$$

$$q=\Psi\alpha$$

where D is an m×n term-document matrix, q is a query vector with m elements; the set of basis functions $\Psi$ is m×k and its columns are a dictionary of basis functions $\{\Psi_j, j=1,2,\ldots,k<n\}$; A and $\alpha$ are a k×n matrix and k-length vector of transform coefficients, respectively. The columns of A are document transforms, whereas $\alpha$ is the query transform. Ranking a document against a query is a matter of comparing a and the corresponding column of A in a reduced transform space spanned by $\Psi$. The decomposition of an overdetermined system is not unique. Nonuniqueness provides the possibility of adaptation, i.e. of choosing among the many representations, or transform spaces, one of which is more suited for the purposes of the disclosed system.

LSI transforms the matrix D as $D'=U_k\Lambda_k V_k^T$ where $\Lambda=diag(\lambda_1,\ldots,\lambda_k)$, and $\{\lambda_i, i=1,k\}$ are the first k ordered singular values of D, and the columns of $U_k$ and $V_k$ are the first k orthonormal eigenvectors associated with $DD^T$ and $D^TD$ respectively. From this we see that $\Psi=(U\Lambda)_k$ and $A=V_k^T \{A_j, j=1,2,\ldots,n\}$. The columns of A are a set of norm preserving, orthonormal basis functions. If we use the cosine metric to measure the distance between the transformed documents and query, we can show that as k→n $$\cos(A_j, \alpha) = \frac{A_j^T \cdot \alpha}{\|A_j^T\|\|\alpha\|} \approx \frac{w}{\|w\|}$$

where $w=A^T\alpha$ is the smallest $l_2$ norm solution to the linear system Dw=q. Reducing the number of eigenvectors in the approximation to the inverse of D has a regularizing effect on the solution vector w, since it reduces its norm.

The present invention is based on the recognition that the measurement of the distance between the transformed documents and query, as stated above is a special solution to the more general optimization problem $$\min\|f(w)\|_n \text{subject to } Dw=q \qquad (2)$$

where $\|f(w)\|_n$ is a functional which quantifies some property of the solution vector w, n is the order of the desired norm, D is the term-document matrix and q is a query vector. The spectral expansion techniques of linear inverse theory (Parker, 1977, No. 27 in Appendix A; Backus, 1970, No. 1 in Appendix A), wavelet decomposition and atomic decomposition by basis pursuit (Chen et al, 1996, No. 9 in Appendix A) and wavelet packets (Wickerhauser, 1994, No. 35 in Appendix A) provide a number of computationally efficient methods for decomposing an overdetermined system into an optimal superposition of dictionary elements.

The disclosed search engine includes an application of the Backus and Gilbert inversion method to the solution of equation (2) above.

The Inverse Inference Approach of the Disclosed System

Inverse theory departs from the multivariate analysis approach implied by LSI by modeling the information retrieval process as the impulse response of a linear system. This approach provides a powerful mechanism for control and feedback of the information process. With reference to Press et al (1997), No. 28 in Appendix A, the inverse problem is defined by the Fredholm integral equation:

$$c_i = s_i + n_i = \int r_i(x)w(x)dx + n_i$$

where $c_i$ is a noisy and imprecise datum, consisting of a signal $s_i$ and noise $n_i$; $r_i$ is a linear response kernel, and w(x) is a model about which information is to be determined. In the disclosed approach to information retrieval, the above integral equation translates as $$q_i = q''_i + n_i = \int D_i(x)w(x)dx + n_i \qquad (3)$$

where $q_i$, an element in the query datum, is one of an imprecise collection of terms and term weights input by the user, $q''_i$ is the best choice of terms and term weights that the user could have input to retrieve the documents that are most relevant to a given search, and $n_i$ is the difference between the user's choice and such an ideal set of input terms and term weights. A statistical measure of term distribution across the document collection, $D_i(x)$, describes the system response. The subscript i is the term number; x is the document dimension (or document number, when 3 is discretized). The statistical measure of term distribution may be simple binary, frequency, or inverse document frequency indices, or more refined statistical indices. Finally, in the present context, the model is an unknown document distance w(x) that satisfies the query datum in a semantic transform space. Equation (3) above is also referred to as the forward model equation.

The solution to equation (3) in non-unique. The optimization principle illustrated by equation (2) above considers two positive functionals of w, one of which, B[w], quantifies a property of the solution, while the other, A[w], quantifies the degree of fit to the input data. The present system operates to minimize A[w] subject to the constraint that B[w] has some particular value, by the method of Lagrange multipliers:

$$\min A[w] + \lambda B[w] \text{ or } \frac{\partial}{\partial w}\{A[w] + \lambda B[w]\} = 0 \quad (4)$$

where $\lambda$ is a Lagrange multiplier. The Backus-Gilbert method "differs from other regularization methods in the nature of its functionals A and B." (Press et al, 1997, No. 28 in Appendix A). These functionals maximize both the stability (B) and the resolving power (A) of the solution. An additional distinguishing feature is that, unlike what happens in conventional methods, the choice of the constant $\lambda$ which determines the relative weighting of A versus B can easily be made before any actual data is processed.

Implementation of an Illustrative Embodiment the Inverse Inference Engine

The following description of an illustrative embodiment of the disclosed system is made with reference to the concise treatment of Backus and Gilbert inversion found in Press et al. (1997), No. 28 in Appendix A. The measurement of a document-query distance $w_c$ is performed by an illustrative embodiment in a semantic transform space. This semantic transform space is defined by a set of inverse response kernels $T_i(x)$, such that $$w_c(x) = \sum_i T_i(x) q_i \quad (5)$$

Here the document-query distances $w_c$ appear as a linear combination of transformed documents $T_i(x)$ and the terms in input query $q_i$, where i is the term number. The inverse response kernels reverse the relationship established by the linear response kernels $D_i(x)$ in the forward model equation (3). In this particular embodiment, the $D_i(x)$'s are binary, frequency, or inverse document frequency distributions. The integral of each term distribution $D_i(x)$ is defined in the illustrative embodiment as $$H_i = \int D_i(x) dx$$

In finding a solution to equation (3), the disclosed system considers two functionals as in equation (4) above. As before, the functional B[w]=Var[$w_c$] quantifies the stability of the solution. The functional A[w], on the other hand, measures the fit of the solution. The degree of fit is measured as the expected deviation of a computed solution $w_c$ from the true w. The true w gives the ideal choice of query keywords q", when substituted into the forward model equation (3). The relationship between a point estimate of $w_c$ and w can be written as $$w_c(x) = \int \delta(x,x') w(x') dx'$$

where $\delta$ is a resolution kernel, whose width or spread is minimized by the disclosed system in order to maximize the resolving power of the solution. If we substitute equation (5) into equation (3) we arrive at an explicit expression for the resolution kernel $\delta$ $$\delta(x, x') = \sum_i T_i(x) D_i(x')$$

The Backus and Gilbert method chooses to minimize the second moment of the width or spread of $\delta$ at each value of x, while requiring it to have unit area.

These mathematical preambles lead to the following expressions for the functionals A and B:

$$A = \int (x'-x)^2 \delta(x,x')^2 dx' = T(x) \cdot \zeta(x) \cdot T(x)$$

$$B = \text{var}[w_c] = T(x) \cdot S \cdot T(x)$$

where $\zeta_{ij} = \int (x'-x)^2 D_i(x') D_j(x') dx'$ is the spread matrix, and $S_{ij}$ is the covariance matrix of the errors $n_i$ in the input query vector, computed as $S_{ij} = \text{Covar}[n_i, n_j] = \delta_{ij} n_i^2$, if we assume that the errors $n_i$ on the elements of the input query are independent. By allowing for errors in the input query vector, which is based on the terms in the original query, the present system attaches a margin of uncertainty to the initial choice of terms input by the user. Since the user's initial term selection may not be optimal, the present system advantageously allows for a margin of error or a certain degree of flexibility in this regard.

The optimization problem can therefore be rewritten as $$\min_w A[w] + \lambda B[w] = T(x) \cdot [\Gamma(x) + \lambda S] \cdot T(x) \quad (6)$$

subject to $T(x) \cdot H = 1$ where $\lambda$ is a Lagrange multiplier. The constraint follows from the requirement that the resolution kernel $\delta$ has unit area. Solving for T(x) we have an explicit expression for the document transform performed by the present system:

$$T(x) = \frac{[\Gamma(x) + \lambda S]^{-1} \cdot H}{H \cdot [\Gamma(x) + \lambda S]^{-1} \cdot H}$$

Substituting into (5), we have an expression for the distance between documents and the query q, as performed by the disclosed system:

$$w_c(x) = \frac{q \cdot [\Gamma(x) + \lambda S]^{-1} \cdot H}{H \cdot [\Gamma(x) + \lambda S]^{-1} \cdot H} \quad (7)$$

Note that there is no need to compute the inverse of the matrix $[\zeta(x) + \lambda S]^{-1}$ explicitly. Instead, the present system solves for some intermediate vector y in the linear system $[\zeta(x) + \lambda S] \cdot y = H$, and substitutes y for $[\zeta(x) + \lambda S]^{-1} \cdot H$ in (7). A property of the matrix $\zeta$ which plays to the advantage of the disclosed system is that it is sparse. The particular computational method used in the vector solution of equation (7) by an illustrative embodiment is LSQR, which is an iterative method for sparse least squares, from a C implementation of the LINPACK library.

Optional parameters available in an illustrative embodiment are: 1) the dimensionality of the semantic transform space; 2) latent term feedback; 3) latent document list; 4) document feedback. The value of the Lagrangian multiplier $\lambda$ in (7) determines the dimensionality of the transform space. The larger the value of $\lambda$, the smaller the number of concepts in transform space, and the coarser the clustering of documents. The effect of the regularization is that relevance weights are assigned more uniformly across a document collection. A relevance judgement is forced even for those documents which do not explicitly contain the keywords in the user query. These documents may contain relevant keyword structures in transform space. By contrast, an exact solution to equation (2) with $\lambda=0$ corresponds to the rigid logic of the vector space model, where the documents are untransformed.

Figure 6:
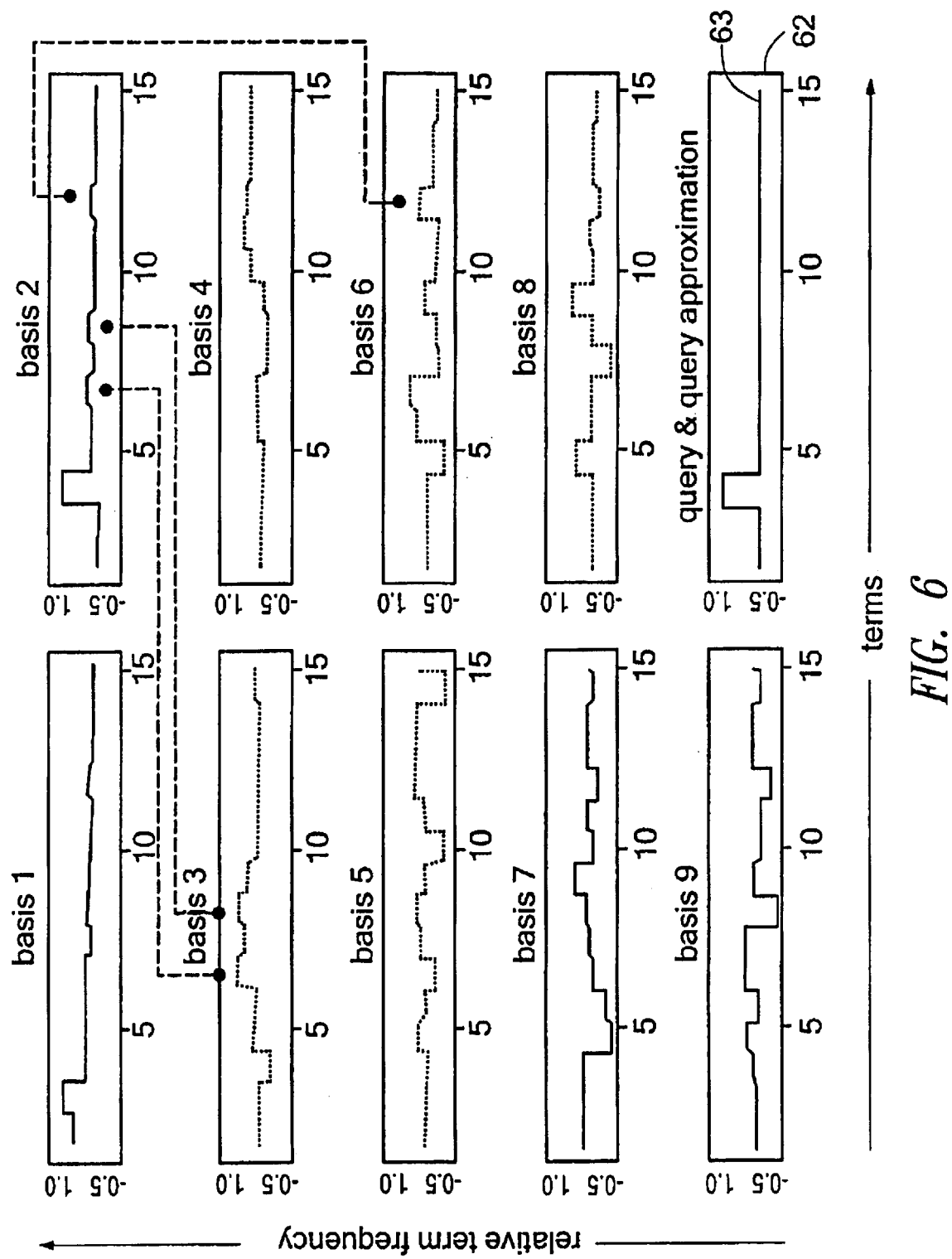
FIG. 6 shows an example of basis function expansion for the single keyword entry "Shakespeare" in an illustrative embodiment of the present invention.

In an illustrative embodiment, the disclosed system achieves latency by sorting the coefficients in the solution to equation (7). Positive coefficients are associated with semantic bases which contain the keywords in the query; negative coefficients are associated with semantic bases which contain latent keywords. To understand keyword structures in this transform space, in FIG. 6 we consider the inverse solution for the input query "Shakespeare" for the example term-document matrix of FIG. 4. The graph 62 of FIG. 6 illustrates the comparison of the desired output query q (solid line 63) and the computed output query q' (undistinguishable from q) for the $l_2$-norm minimizing solution. The output q' is computed as a linear superposition of the first seven bases (also shown in FIG. 6), ordered by decreasing coefficients $|\alpha_i|$. Bases with positive $\alpha_i$ (basis 1 and basis 2) are shown with continuous lines. Bases with negative $\alpha_i$ (basis 3, basis 4, basis 5, basis 6, and basis 8) are shown with dotted lines. The positive bases contain primarily the input query keyword and contribute significantly to the query approximation. They also contain several other keywords (e.g. "theatre", "comedy") which are directly associated with the keyword "Shakespeare" across the document collection. These associated keywords must be subtracted in order for the approximation q' to match the desired output q. The negative bases accomplish this. The negative bases define partitions (or groups) of documents that contain many of the same keyword patterns found in the positive bases, this time never in direct association with the keyword "Shakespeare". Consequently, the negative bases span the space of the latent semantic documents. Latent semantic documents are documents that, while not containing any of the keywords in the user query, may contain a statistically significant number of keywords conceptually related to the keywords in the user query.

The graph 62 displaying q and q' in FIG. 6 illustrates that they are virtually identical, and that they accordingly appear as a single plot 63 in the graph 62. In this way, FIG. 6 shows that by forming a linear combination of bases 1 through 7, an approximation of q' is obtained which is virtually identical to the user query q.

Figure 7:
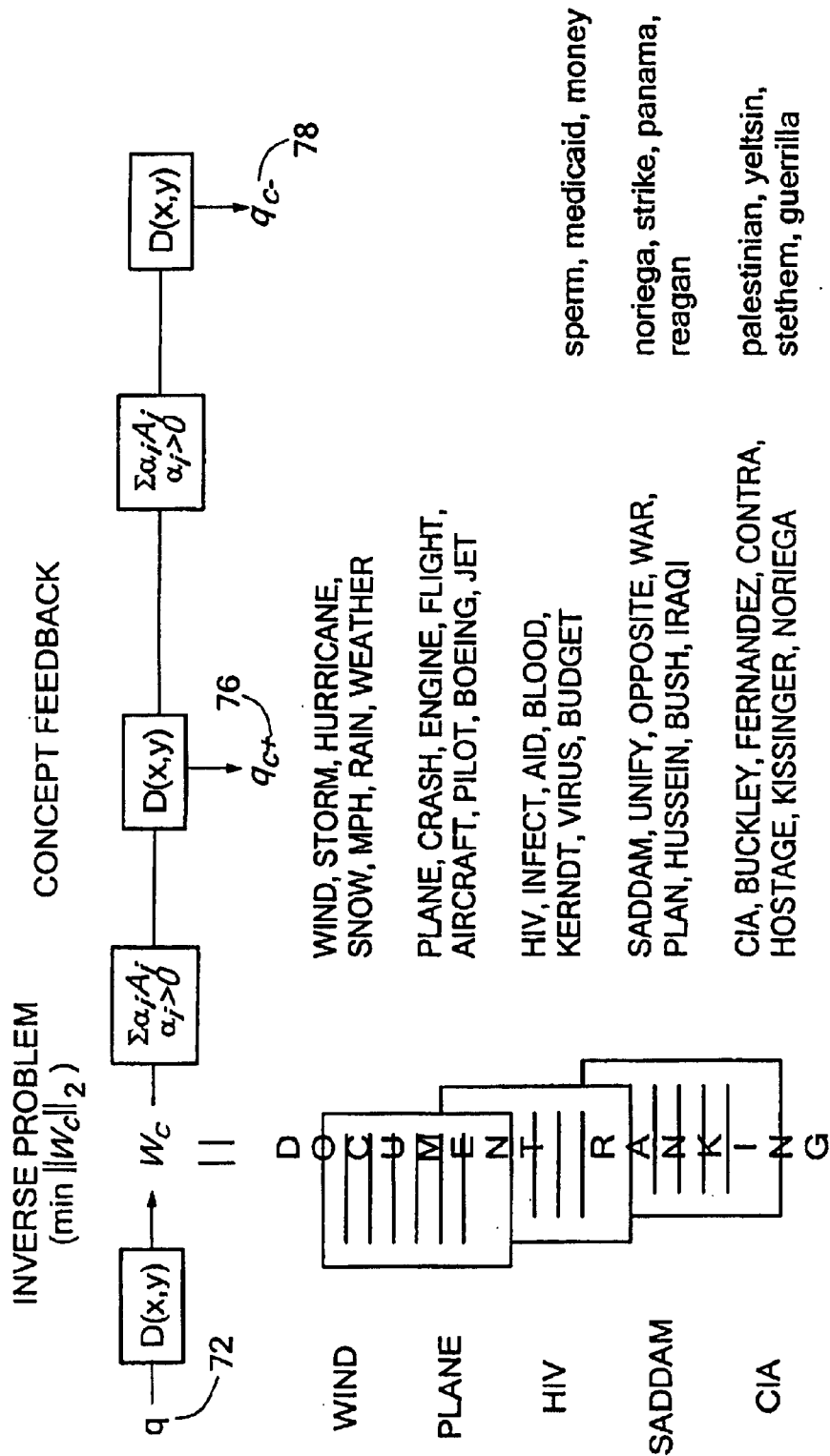
FIG. 7 illustrates a solution of the inverse optimization problem for a number of single term queries.

FIG. 7 shows the semantic keyword feedback obtained by isolating positive and negative coefficients in the truncated basis function expansion for the query approximation $q_c$. As shown in FIG. 7, the inverse optimization problem is solved for a number of single keyword queries q 72. In addition to a ranked list of documents 74, the disclosed inverse inference engine returns a primary list of conceptually relevant terms $q_{c+}$ 76 (terms directly related to the term in q 72) and a secondary list of potentially relevant terms $q_{c-}$ 78 (terms never associated directly with the term in q 72 but found in documents that describe concepts which are semantically related to the term in q). The illustrative test results of FIG. 7 were compiled based on a random sample of 11,841 documents from the TREC (Text Retrieval Conference, a testing program for search engines sponsored by National Institute of Standards of the United States). In particular, documents in the sample are articles and newswires from the San Jose Mercury News and API.

As illustrated by FIG. 7, the disclosed inverse inference engine actually uses information derived from the data to suggest primary and secondary term lists to the user. Among the top documents returned for each query, several relevant documents may appear which do not contain the input keywords. For instance, the unabridged text of the eighth most relevant document returned from a 0.3 second search of 4,000 articles in the San Jose Mercury News (TREC), in response to the query "plane disaster" is "Upcoming shortly will be a writethru to a0516, PM-Britain-Crash, to update with flight recorders found, experts saying both engines may have failed.". Note that, while the returned document does not contain any of the keywords in the query ("plane" and "disaster"), it is in fact a very brief newswire about a plane crash which has just occurred. These results are remarkable, considering that this is a very short document compared to the average document size in the collection.

The Disclosed Graphical User Interface and Internet Navigation Tool

In one embodiment of the disclosed system, a GUI is provided in the Java programming language, based on the JDK1.1 and accompanying Swing Set from SunSoft. The GUI consists of a research module for testing various implementation options outlined above, and a more sophisticated module that includes a hypernavigation tool referred to herein as a "soft hyperlink".

Figure 8:
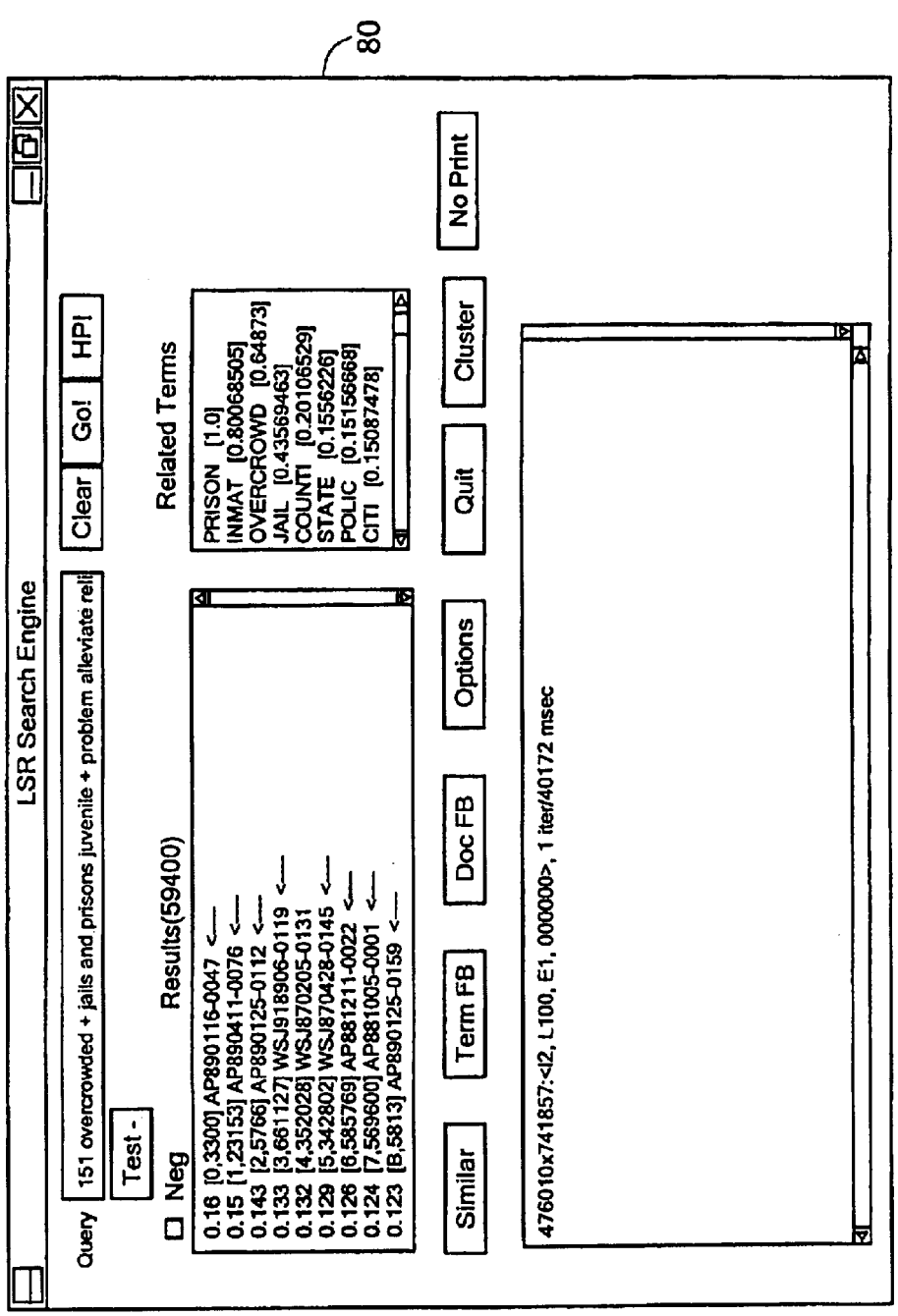
FIG. 8 shows an illustrative Graphical User Interface (GUI)
Figure 9:
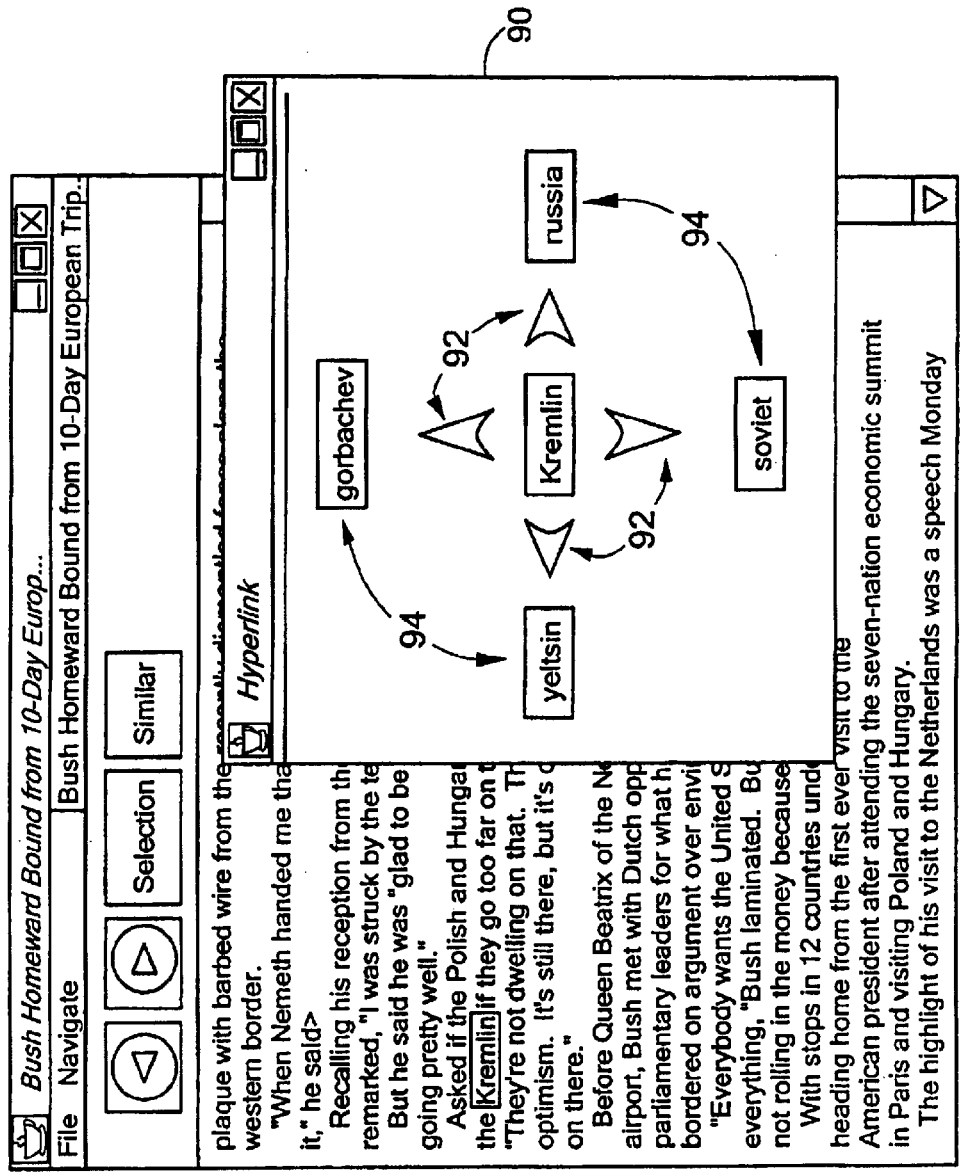
FIG. 9 shows an interface to an internet navigation tool.

The snapshots in FIGS. 8 and 9 show the illustrative GUI and 80 hypernavigation tool 90. The GUI of FIG. 8 shows the top of the document list retrieved for a TREC-3 Category A (an information retrieval task performed on 742,000 documents from the TREC corpus) adhoc query.

FIG. 9 shows a prototype implementation of the soft hyperlink. The navigation tool of FIG. 9 provides freedom to move through a collection of electronic documents independently of any hyperlink which has been inserted in the HTML page. A user may click on any term in a document page, not just the terms that are hyperlinked. Let's assume that the user clicks on the word "Kremlin". The disclosed search engine executes in the background and retrieves a list of related terms. A compass display appears with pointers to the first four concepts returned by the engine. Now, the user has a choice to move from the current document to one of four document lists which cover different associations of the keyword "Kremlin": 1) "Kremlin and Yeltsin"; 2) "Kremlin and Gorbachev"; 3) "Kremlin and Russia"; 4) "Kremlin and Soviet". An additional modality of the disclosed system allows the user to jump from a current document to the next most similar document, or to a list of documents that are relevant to a phrase or paragraph selection in the current page. The "soft hyperlink" of FIG. 9 provides ease and freedom of navigation without the complexities of a search engine.

Figure 10:
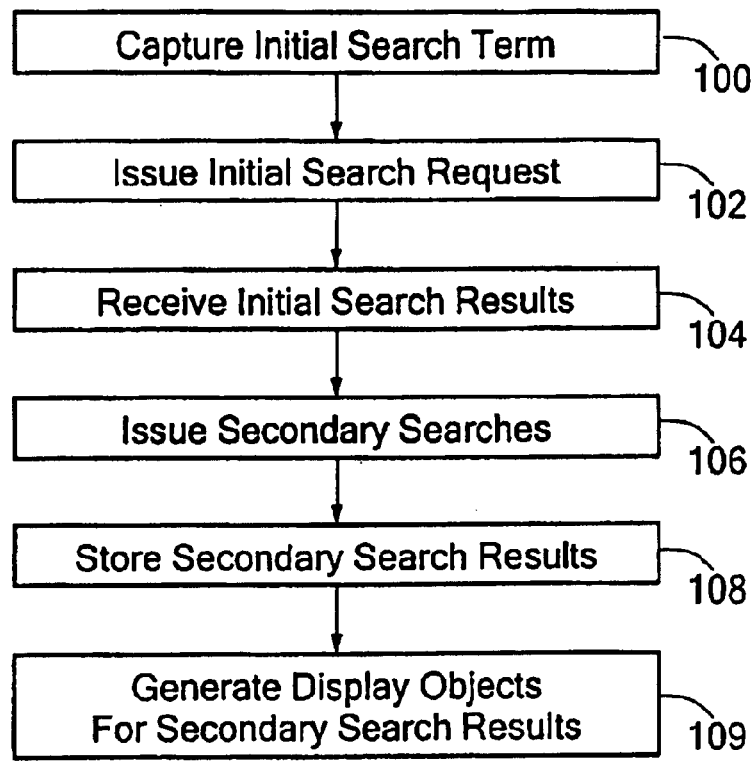
FIG. 10 is a flow chart which shows a series of steps performed by the internet navigation tool of FIG. 9.

FIG. 10 shows steps performed by an illustrative embodiment of the disclosed system for providing an Internet navigation tool. At step 100 of FIG. 10, the disclosed system captures a user indication of an initial term displayed in connection with a document, such as a word being displayed in connection with the presentation of a web page through an Internet Browser application program. The disclosed system may show that the initial term has been captured by causing the initial term to be highlighted with the user display. Alternatively, any other form of indication may be employed, such as underlining, changing color, etc. The initial term may be any one or set of display objects within the web page, and specifically may consist of or include one or more non-hyperlinked display objects. For example, the initial term may include a phrase, a paragraph or a figure indicated by the user.

At step 102, the disclosed system issues an initial search request, via a search engine, using an initial search query consisting of the initial term. At step 104, a plurality of terms that are related to the initial search query are received as search results from the search engine. These related terms may be, for example, sorted in decreasing order of correlation to the initial term. The disclosed system may attach a relevance level to each one of a predetermined number of the initial search result terms, the relevance level reflecting a correlation to the initial term, and these relevance levels may be displayed to the user. In an illustrative embodiment, the relevance levels reflect a lexical correlation between the initial term and each respective one of the initial search result terms.

The disclosed system then selects a predetermined number of the related terms returned by the search engine. The related terms may, for example, reflect the contents of a generated lexical knowledge base. In an illustrative embodiment, the disclosed system presents the selected predetermined number of related terms to the user through a "compass" like display interface, however, this is only one of many ways in which the terms could be presented to the user. For example, in alternative embodiments, such related terms could be presented to the user through a drop-down menus or list, or some other graphical presentation.

The disclosed system then captures an indication from the user of at least one of the related terms. At step 106, in response to the selection by the user of some number of the related terms, the disclosed system issues at least one secondary search request. The search query for the secondary search request combines the selected related term or terms and the initial search term. In an illustrative embodiment, the disclosed system forms a logical AND expression including one or more initial search result terms selected by the user from the initial search result terms, together with the initial search term. The secondary search query thus includes a logical AND expression between selected ones of initial search result terms and the initial term.

The disclosed system then stores a number of secondary search result document weights at step 108, for example in decreasing order. The secondary search result document weights are received in response to the secondary searches issued at step 106, and the decreasing order in which they are stored places the documents that are most related to the secondary search query a the beginning of the list.

At step 109, the disclosed system generates a number of display objects associated with the secondary search results. In this regard, the disclosed system retrieves the electronic information file associated with the first weight in the list of sorted document weights, and displays to the user a portion of that electronic information file containing the first occurrence of the initial search term, with the initial term being highlighted or otherwise emphasized in some way. The disclosed system further retrieves, in response either to a selection or indication by the user, or in response to a predetermined number, one or more electronic information files associated with the document weights generated in response to the secondary searches issued at step 106. The disclosed system displaying portions of these information files containing the first occurrence of initial search term to the user, with the initial search term being highlighted in some manner.

In illustrative embodiments, the user interfaces of FIG. 8 and FIG. 9 may be implemented on Unix, Windows NT, Windows 95, 98 or 2000 platforms and provided with CORBA wrappers for deployment over a distributed network.

Latent Information

Figure 11:
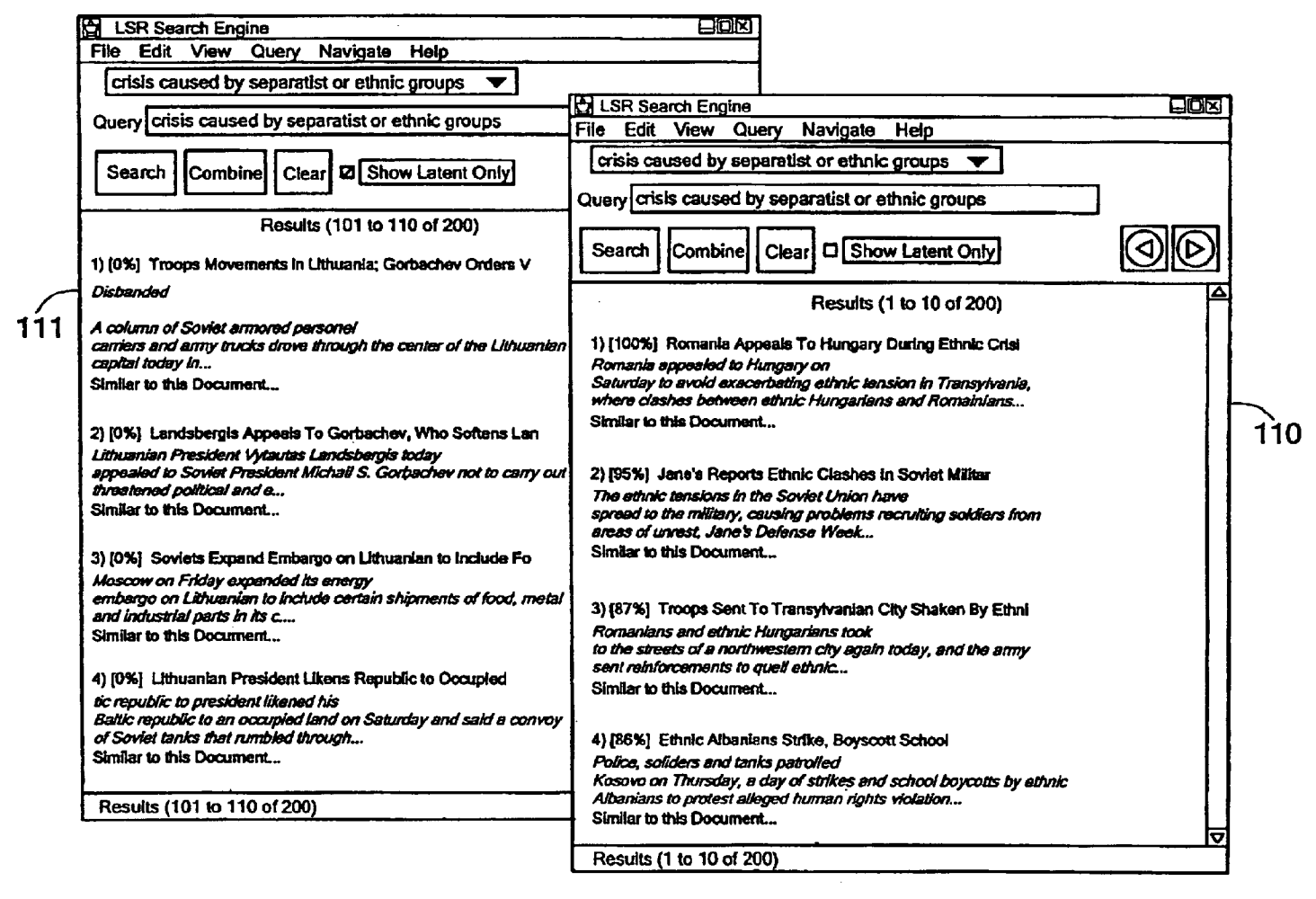

In the disclosed inverse solution, a positive and a negative semantic space are considered. Accordingly, the disclosed system returns a list of direct document hits (documents that contain some of the keywords in a query) and a list of latent semantic hits (documents that do not contain any of the keywords in a query, but which may be relevant to a query). The user can switch between the two lists. In an illustrative example, a search on the TREC corpus for a "crisis caused by separatist or ethnic groups" (FIG. 11) would return information on various crises in Transylvania, the Soviet Union and Albania in a first panel 110. When the user selects the latent list, as shown in a second panel 111, a vast body of information on the Lithuanian crisis is discovered, which would otherwise be missed. The articles in the second panel 111 do not contain any of the keywords in the query. Instead, for example, the language in the articles in the second panel 111 refers consistently to a struggle for "independence" and to "a linguistic minority". The disclosed search technique may locate many more relevant documents than a conventional search engine, because of its latent concept associations. Because the rankings of the positive and latent documents differ by several orders of magnitude, in an illustrative embodiment, the two lists are maintained separately. Alternatively, an empirical weighting scheme may be employed across both lists.

Speed and Memory Usage

An embodiment of the disclosed system provides query times of 7.0 sec for TREC category B (170,000 docs) and 30.5 sec for TREC category A (742,000 docs) on a SUN ULTRA 60, which compares favorably to prior systems. The disclosed system advantageously provides performance times that are sublinear. The scalability of the disclosed approach allows establishment of latent semantic links across extremely large collections, by comparison to what is possible with the SVD approach of existing systems. Memory requirements for the disclosed system vary according to the sparsity of the matrix and term distribution.

Other Commercial Applications of the Disclosed System

A search engine may only be one application of the disclosed information retrieval technology. The disclosed technology may form the basis for a variety of information retrieval tools. Some of these potential applications are outlined below.

Semantic Interpreter

Figure 12:
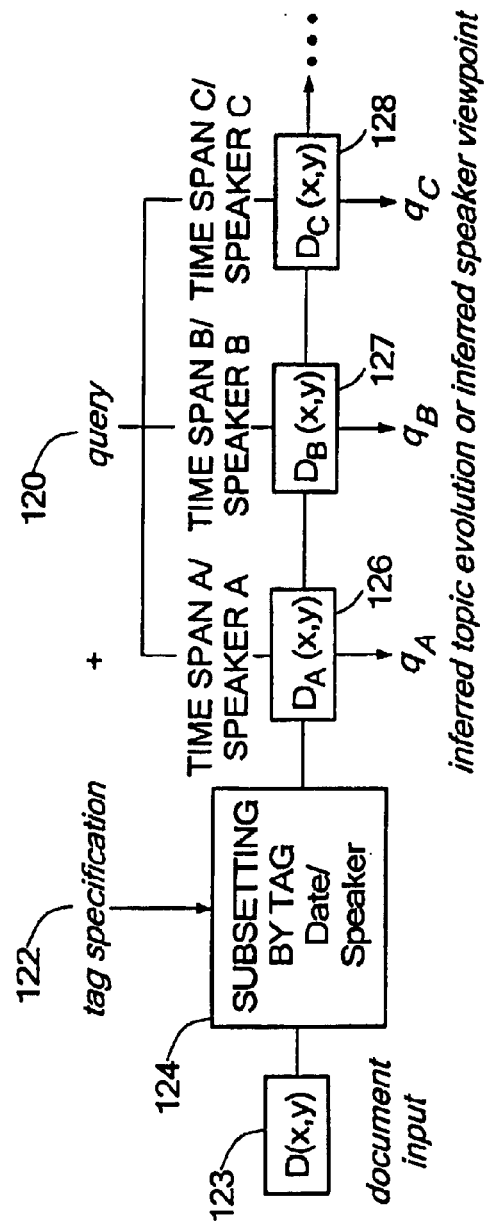
FIG. 12 illustrates the evolution of concepts or conversations at browsing time.

The disclosed information retrieval technology may form the basis for a tool referred to as a "semantic interpreter". The semantic interpreter summarizes evolutionary trends in news articles, and performs categorization of speech or on-line chat monitoring. It is a browsing tool which allows a user to rapidly compare the content of a current document set to some earlier document set, and/or determine or summarize conceptual trends in a conversation. As illustrated in FIG. 12, the semantic interpreter may perform a search combining a series of terms (query 120) with one or more tag filters 122. The tag filters 122, for example, identify different time intervals corresponding to creation or modification times associated with various ones of the electronic text files or other types of input documents. The tag filters 122 may further indicate specific participants in a conversation, or other identifiable characteristics of specific ones of the input documents represented by the term-document matrix 123. The matrix 123 is subset or partitioned by the subsetting module 124, using tag specification(s) 122, and the inverse inference engine provides concept feedback specific to each of the partitions A 126, B 127, and C 128. This mechanism allows the user to compare the content of a current document set to some earlier document set, and determine conceptual trends. Input to the semantic interpreter could be electronic text from the Web, an electronic database, or digitized speech from a speech recognizer.

Intelligent Sorting of Large and Unstructured Electronic Collections

Figure 13:
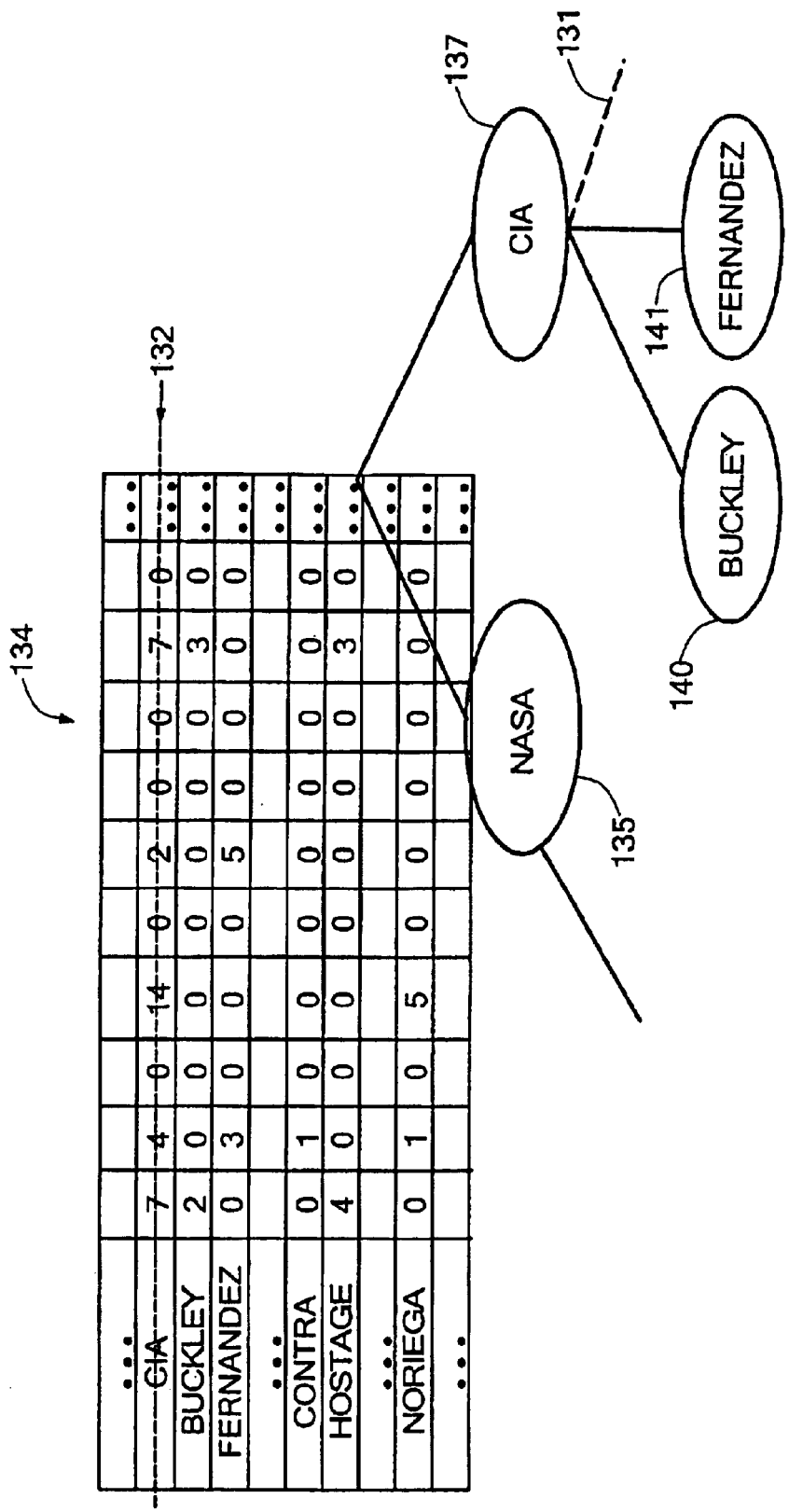
FIG. 13 illustrates the concept of hierarchical clustering and categorization with inverse decision trees.

As shown in FIG. 13, a recursive implementation of the disclosed inverse inference technique leads to a fast method for partitioning database space with groups of bases which are hierarchically arranged in trees. A distinguishing term 132 (for example "CIA") used to characterize a cluster is dropped from the indices of the term-document matrix 134, after initial differentiation. The inverse inference problem is then solved for the subset of the term-document matrix 134 which clustered around the dropped concept term 132. The new bases are used to partition the parent cluster (CIA). This partitioning is illustrated by the tree graph 130. The tree graph 130 is interpreted top to bottom. The dotted line 131 indicates that the tree is very large, above and below the relatively small section shown in FIG. 13. Above the NASA node 135, and the CIA node 137, there may, for purposes of example, be a parent node (not shown) GOVERNMENT AGENCIES. The CIA node 137 is a child node of such a GOVERNMENT AGENCIES node and a parent node of BUCKLEY 140, FERNANDEZ 141, and the dotted line 131 indicates that there could be one or more children of CIA 137 to the right of FERNANDEZ. An illustrative example of how child nodes may be generated from parent nodes is now described with reference to FIG. 13. Having initially grouped all documents pertaining to the CIA, and considering that each document is a column in the term-document matrix, the constrained optimization problem for the subset of the matrix comprising only these columns may now be solved. The CIA term can be removed, after forming the subset and prior to solving the constrained optimization problem, since CIA now appears in all the documents which form the subset, and it is therefore non-diagnostic. The operation is repeated for all clusters or all major matrix partitions. This recursive scheme should be fast and efficient since the inverse algorithm would be applied to progressively smaller partitions of the term-document matrix. Tests have shown that an inversion for a 100,000×100,000 partition takes an implementation of the disclosed system only about 10 seconds. In addition, this operation is parallelizable with respect to each node in the tree 130. Such "Inverse Decision Trees" could provide a fast and intuitive way to analyze large collections of documents. They could start a revolution equivalent to that caused by the introduction of classification and regression trees in multivariate regression analysis.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Specifically, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

Appendix A

Below is a list of the documents referred to in the present disclosure:

1. Backus, G., Inference from inadequate and inaccurate data, *Proc. Nat. Acad. Sci. U.S.*, 65, pp. 1–7, pp. 281–287, and 67, pp.282–289,1970.
2. Bartell, B. T., W. C. Cottrell, and Richard K. Belew, Latent Semantic Indexing is an Optimal Special Case of Multidimensional Scaling, 1996
3. Bateman, J. A., Kasper, R. T., Moore J. D., and Whitney, R. A. A general organization of knowledge for NLP: The PENMAN upper model, Technical Report, USC/Information Sciences Institute, 1990.
4. Bernstein, M, Bolter, J. D., Joyce, M., and Mylonas, E., Architecture for volatile hypertext, Hypertext 92: Proceedings of the Third ACM Conference on Hypertext, ACM Press, pp. 243–260, 1991
5. Berry, M., S. T. Dumais, G. O'Brien, Using linear algebra for intelligent information retrieval, *SIAM Review*, Vol. 37, No. 4, pp. 553–595, December 1995.
6. Boose, J. H., A knowledge acquisition program for expert systems based on personal construct psychology, International Journal of man-machine Studies, 23, pp 495–525
7. Bouaud, J., Bachimont, B., Charlet, J., and Zweigenbaum, P. Methodological Principles for Structuring an "Ontology". In Proc. Workshop on Basic Ontological Issues in Knowledge Sharing, International Joint Conference on Artificial Intelligence (IJCAI-95), Montreal, Canada, August 1995.
8. Broglio J, Callan J P, Croft W B. INQUERY system overview. In: Proceedings of the TIPSTER Text Program (Phase I). San Francisco, Calif.: Morgan Kaufmann, 1994, pp 47–67.
9. Chen, S., D. Donoho, M. Saunders, Atomic decomposition by basis pursuit, *Stanford University, Department of Statistics Technical Report*, February 1996.
10. Deerwester, S., S. T. Dumais, G. W. Furnas, T. K. Landauer, and R. Harshman. Indexing by latent semantic analysis. Journal of the American Society for Information Science, 41:391–407, 1990.
11. Dumais, S. T., Improving the Retrieval of Information from external sources, Behavior Res. Meth., Instruments, Computers, 23 (1991), pp.229–236
12. Dumais, S. T., Platt, J., Heckerman, D., and Sahami, M., Inductive Learning Algorithms and Representations for Text Categorization, *Proceedings of ACM-CIKM98*, November 1998.
13. Foltz, P. W., Kintsch, W.,& Landauer, T. K. (1998). The measurement of textual Coherence with Latent Semantic Analysis. Discourse Processes, 25, 285–307.
14. Guarino, N. Some Ontological Principles for a Unified Top-Level Ontology. Spring Symposium on Ontological Engineering, AAAI Tech Report, SS-97-06, American Association for Artificial Intelligence, March 1997.

15. Hartman, D., R. Baeza-Yates, E. Fox, and W. Lee, Inverted Files, in Information Retrieval, edited by W. F. Frakes and R. Baeza-Yates, Prentice-Hall, 1992.
16. Landauer, T. K., & Dumais, S. T. (1997). A solution to Plato's problem: The Latent Semantic Analysis theory of the acquisition, induction, and representation of knowledge. Psychological Review, 104, 211–240.
17. Landauer, T. K., Foltz, P. W., & Laham, D. (1998). Introduction to Latent Semantic Analysis. Discourse Processes, 25, 259–284.
18. Landauer, T. K., Laham, D., & Foltz, P. W., (1998). Learning human-like knowledge by Singular Value Decomposition: A progress report. In M. I. Jordan, M. J. Kearns & S. A. Solla (Eds.), Advances in Neural Information Processing Systems 10, (pp. 45–51). Cambridge: MIT Press.
19. Landauer, T. K., Laham, D., Rehder, B., & Schreiner, M. E., (1997). How well can passage meaning be derived without using word order? A comparison of Latent Semantic Analysis and humans. In M. G. Shafto & P. Langley (Eds.), Proceedings of the 19th annual meeting of the Cognitive Science Society (pp. 412–417). Mawhwah, N.J.: Erlbaum.
20. Lenat, D. B. and Guha, R. V. Building Large Knowledge-Based Systems. Reading, Mass.: Addison-Wesley, 1990.
21. Lopresti, D., and J. Zhou, Retrieval strategies for noisy text, *Fifth Annual Symposium on Document Analysis and Information Retrieval*, pp. 255–269, Las Vegas, April 1996.
22. Madigan, D. and J. York. Bayesian graphical models for discrete data. International Statistical Review 63, 215–32
23. Mahesh, K. Ontology Development for Machine Translation: Ideology and Methodology. Technical Report MCCS-96-292, Computing Research Laboratory, New Mexico State University, 1996.
24. Mahesh, K., J. Kud, and P. Dixon, Oracle at TREC-8: A Lexical Approach, Proceedings of The Eighth Text REtrieval Conference (TREC-8), NIST Special Publication XXX-XXX, National Institute of Standards, 1999
25. Miller, G., WordNet: An on-line lexical database. International Journal of Lexicography 3(4) (Special Issue), 1990
26. O'Brien, G. W., Information Management Tools for Updating an SVD-Encode Indexing scheme, master's thesis, The University of Knoxville, Knoxville, Tenn., 1994
27. Parker, R., Understanding inverse theory, *Ann. Rev. Earth Planet. Sci.*, 5, pp. 35–64, 1977.
28. Press, W. H, S. A. Teukolsky, W. T. Vetterling, and B. P. Flannery. Numerical Recipes in C. The Art of Scientific Computing. Cambridge University Press, 1997.
29. Rajashekar, T. B. and W. B. Croft, Combining Automatic and Manual Index Representations in Probabilistic Retrieval, Journal of the American Society for Information Science, 46 (4):272–283, 1995.
30. Salton, G., E. Fox, U. Wu, Extended Boolean information retrieval, *Communications ACM*, 26, pp. 1022–1036, 1983.
31. Vogel, C., An Overview of Semiotics and Potential Applications for Computational Semiotics, First International Workshop on Computational Semiotics, 1997
32. Vogel, C., Applying Computational Semiotics to Text Mining, Journal of AGSI, July 1998
33. Waltz, D. L., and Pollack, J. B., massively parallel parsing: a strong interactive model of natural language interpretation, Cognitive Science, 9, pp. 51–74, 1985
34. Werbach, K., Search and Serchability, Release 1.0, pp. 1–24, Jan. 15, 1999.
35. Wickerhauser, M. V, Adapted Wavelet Analysis from theory to software, 1994
36. Wolfe, M. B., Schreiner, M. E., Rehder, B., Laham, D., Foltz, P. W., Kintsch, W., & Landauer, T. K. (1998). Learning from text: Matching readers and text by Latent Semantic Analysis. Discourse Processes, 25, 309–336.

What is claimed is:

1. A computer-implemented method for navigating through a set of electronic documents, comprising:

capturing an indication of an initial term displayed in connection with a document, wherein the initial term is one of a plurality of terms displayed in connection with the document, wherein the plurality of terms includes hyperlinked and non-hyperlinked terms;

issuing an initial search request of the set of electronic documents, via a search engine, using an initial search query consisting of the initial term, the initial search request causing the search engine to perform a correlation analysis of the set of documents compared with the initial search query;

receiving a plurality of related terms from the search engine as an initial search result, the related terms determined from the correlation analysis of the set of documents;

selecting a predetermined number of the received plurality of related terms and presenting the selected related terms graphically;

capturing an indication of at least one of the plurality of related terms; and issuing, responsive to the indication of the at least one of the related terms, at least one secondary search request, wherein a secondary search query associated with the secondary search request includes the indicated related term and the initial term;

storing a plurality of secondary search result document weights; and retrieving an information file associated with a first one of the document weights and displaying a portion of the retrieved information file containing a first occurrence of the initial term.

2. The method of claim 1, further comprising retrieving one or more of a plurality of information files associated with respective ones of the plurality of secondary search result document weights, and displaying portions of the plurality of information files containing first occurrences of the initial term.

3. The method of claim 1 wherein the capturing the indication of the initial term displayed in connection with the document further comprises capturing a non-hyperlinked term, and wherein the initial term includes the non-hyperlinked term.

4. The method of claim 1 wherein the issuing the secondary search request includes forming a logical AND expression between the indicated related term and the initial term, and wherein the secondary search query includes the logical AND expression between the indicated related term and the initial term.

5. The method of claim 1 wherein the capturing the indication of the initial term displayed in connection with the document further comprises capturing a phrase, and wherein the initial term includes the indicated phrase.

6. The method of claim 1 wherein the capturing the indication of the initial term displayed in connection with the document further comprises capturing a paragraph, and wherein the initial term includes the indicated paragraph.

7. The method of claim 1 wherein the capturing the indication of the initial term displayed in connection with the document further comprises capturing one or more indicated documents, and wherein the initial term includes the indicated documents.

8. The method of claim 1 wherein the selecting the predetermined number of the received plurality of related terms includes associating a relevance level with each one of the related terms selected from the received plurality of related terms.

9. The method of claim 8 wherein each relevance level reflects a lexical correlation between the initial term used in the initial search request and the respective selected one of the received plurality of related terms.

10. The method of claim 1 wherein the electronic documents comprise Web pages accessible through the World Wide Web.

11. The method of claim 1 wherein the electronic documents comprise information files accessible through the Internet.

12. The method of claim 1 wherein the correlation analysis of the set of documents performed by the search engine uses Latent Semantic Regression.

13. The method of claim 1, the receiving the plurality of related terms from the search engine as an initial search result further comprising receiving the plurality of related terms from the search engine as an initial search result, wherein at least two of the received related terms occur in at least two documents that do not contain co-occurrences of the two related terms.

14. The method of claim 1, the receiving the plurality of related terms from the search engine as an initial search result further comprising receiving the plurality of related terms from the search engine as an initial search result, the related terms being sorted based upon correlation to the initial term.

15. The method of claim 1, the storing the plurality of secondary search result document weights further comprising storing the plurality of secondary search result document weights, the document weights being sorted in decreasing order.

16. The method of claim 1, the presenting the selected related terms graphically further comprising presenting the selected related terms as part of a compass-like navigation tool.

17. A navigation system for examining a set of electronic documents, comprising:
   a search engine structured to perform a correlation analysis of a query and the set of electronic documents and determine related terms, each related term an indicator of a set of documents that is related to the query;
   a graphic navigation tool structured to receive and display a plurality of secondary terms; capture an indication of at least one of the plurality of displayed secondary terms; issue a secondary search request that includes the indicated secondary term and the initial term in a secondary search query; receive a plurality of indicators of documents that are related to the secondary search query, the indicators of the related documents having associated document weights; retrieve an information file associated with a first one of the document weights; and display a portion of the retrieved information file containing a first occurrence of the initial term; and
   a user interface structured to capture an indication of an initial term from a plurality of terms displayed in connection with the document, wherein the displayed plurality of terms includes hyperlinked and non-hyperlinked terms; issue an initial search request of the set of electronic documents to the search engine, using an initial search query consisting of the initial term; receive a plurality of related terms from the search engine as an initial search result, the related terms determined from the correlation analysis; select a predetermined number of the received plurality of related terms; and invoke the graphic navigation tool with the selected related terms as the plurality of secondary terms to display.

18. The navigation system of claim 17 wherein the graphic navigation tool retrieves one or more of a plurality of information files associated with respective ones of the plurality of document weights, and displays portions of the plurality of information files containing first occurrences of the initial term.

19. The navigation system of claim 17 wherein the captured initial term includes the non-hyperlinked term.

20. The navigation system of claim 17 wherein the secondary search query is formed using a logical AND expression between the indicated related term and the initial term.

21. The navigation system of claim 17 wherein the captured indication of the initial term includes a phrase.

22. The navigation system of claim 17 wherein the captured indication of the initial term includes a paragraph.

23. The navigation system of claim 17 wherein the captured indication of the initial term includes a document.

24. The navigation system of claim 17 wherein a relevance level is associated with each one of the related terms selected from the received plurality of related terms.

25. The navigation system of claim 24 wherein each relevance level reflects a lexical correlation between the initial term used in the initial search request and the respective selected one of the received plurality of related terms.

26. The navigation system of claim 17 wherein the electronic documents comprise information files accessible through the Internet.

27. The navigation system of claim 17 wherein the correlation analysis of the set of documents performed by the search engine uses Latent Semantic Regression.

28. The navigation system of claim 17 wherein at least two of the related terms determined by the search engine indicate at least two documents that do not contain co-occurrences of the two related terms such that the at least two documents are latently related through a third related term.

29. A computer-implemented method for navigating through a corpus of documents stored in a network of computer systems, comprising:
   displaying a document with a plurality of terms and receiving an indication of an initial one of the plurality of terms;
   automatically causing a search engine to perform a search using an initial search query that contains the indicated initial term, the search performing a correlation analysis of the corpus of documents relative to the initial term and determining a set of related terms from documents that are directly related to the initial term and from documents that have latent associations with the initial term, each related term associated with a set of documents that are related to the initial term;
   receiving from the search engine the determined set of related terms and presenting a determined number of the received related terms through a navigation tool;
   receiving an indication of one of the presented related terms;

automatically causing a secondary search to be performed using a secondary search query that includes the initial term and the indicated related term, the secondary search determining a set of weighted indicators to documents; and receiving the determined set of weighted indicators to documents and displaying a portion of one or more documents that are indicated by one or more of the weighted indicators.

30. The method of claim 29 wherein the navigation tool is a compass-like display of the determined number of the received related terms.

31. The method of claim 29 wherein each of the received related terms is associated with a relevance level and the presenting the determined number of the receiving related terms includes presenting the associated relevance levels.

32. The method of claim 29 wherein the determining the set of related terms from documents that are directly related to the initial term and from documents that have latent associations with the initial term, each related term associated with a set of documents that are related to the initial term further comprises:

determining the set of related terms from documents that contain co-occurrences of the initial term and one of the related terms and from documents that contain co-occurrences of at least two of the related terms but not the initial term, each related term thereby associated with a set of documents that are directly and latently related to the initial term.

33. The method of claim 29 wherein each displayed portion of one or more documents that are indicated by one or more of the weighted indicators indicates a first occurrence of the initial term.

34. The method of claim 29 wherein the search performs the correlation analysis of the corpus of documents relative to the initial term using a Latent Semantic Regression analysis.

35. The method of claim 29 wherein the plurality of terms displayed in the document includes hyper-linked terms and non-hyperlinked terms.

36. The method of claim 35 wherein the initial term includes a non-hyperlinked term.

37. The method of claim 29 wherein each term comprises one or more words, phrases, documents, figures, and objects.

38. The method of claim 29 wherein the navigation tool displays the determined number of the received related terms in an area separate from the document such as a menu, a list, or other graphical presentation.

39. The method of claim 29 wherein the network is the Internet.

40. The method of claim 29 wherein the corpus of documents includes web pages.

41. A computer-readable memory medium containing instructions for controlling a computer processor to navigate through a corpus of documents stored in a network of computer systems, by:

displaying a document with a plurality of terms and receiving an indication of an initial one of the plurality of terms;

automatically causing a search engine to perform a search using an initial search query that contains the indicated initial term, the search performing a correlation analysis of the corpus of documents relative to the initial term and determining a set of related terms from documents that are directly related to the initial term and from documents that have latent associations with the initial term, each related term associated with a set of documents that are related to the initial term;

receiving from the search engine the determined set of related terms and presenting a determined number of the received related terms through a navigation tool;

receiving an indication of one of the presented related terms;

automatically causing a secondary search to be performed using a secondary search query that includes the initial term and the indicated related term, the secondary search determining a set of weighted indicators to documents; and receiving the determined set of weighted indicators to documents and displaying a portion of one or more documents that are indicated by one or more of the weighted indicators.

42. The memory medium of claim 41 wherein the navigation tool is a compass-like display of the determined number of the received related terms.

43. The memory medium of claim 41 wherein the determining the set of related terms from documents that are directly related to the initial term and from documents that have latent associations with the initial term, each related term associated with a set of documents that are related to the initial term further comprises:

determining the set of related terms from documents that contain co-occurrences of the initial term and one of the related terms and from documents that contain co-occurrences of at least two of the related terms but not the initial term, each related term thereby associated with a set of documents that are directly and latently related to the initial term.

44. The memory medium of claim 41 wherein each displayed portion of one or more documents that are indicated by one or more of the weighted indicators indicates a first occurrence of the initial term.

45. The memory medium of claim 41 wherein the search performs the correlation analysis of the corpus of documents relative to the initial term using a Latent Semantic Regression analysis.

46. The memory medium of claim 41 wherein the plurality of terms displayed in the document includes hyper-linked terms and non-hyperlinked terms.

47. The memory medium of claim 46 wherein the initial term includes a non-hyperlinked term.

48. The memory medium of claim 41 wherein each term comprises one or more words, phrases, documents, figures, and objects.

49. The memory medium of claim 41 wherein the navigation tool displays the determined number of the received related terms in an area separate from the document such as a menu, a list, or other graphical presentation.

50. A navigation system for determining relevant information from a corpus of documents stored in a network of computer systems, comprising:

a search engine that is structured to perform a correlation analysis of the corpus of documents relative to a search query containing an initial term and to determine a set of related terms from documents that are directly related to the initial term and from documents that have latent associations with the initial term, each related term associated with a set of documents that are related to the initial term; and a user interface that is structured to display a document with a plurality of terms and receive an indication of one of the plurality of terms;

automatically invoke the search engine using a search query that contains the indicated term and receive from the search engine the determined set of related terms;

present a determined number of the received related terms through a navigation tool and receive an indication of one of the presented related terms;

automatically cause a secondary search to be performed using a secondary search query that includes the initial term and the indicated related term, the secondary search determining a set of weighted indicators to documents; and receive the determined set of weighted indicators to documents and display a portion of one or more documents that are indicated by one or more of the weighted indicators.

51. The system of claim 50 wherein the navigation tool is a compass-like display of the determined number of the received related terms.

52. The system of claim 50 wherein each of the received related terms is associated with a relevance level and the user interface is structured to present the determined number of the received related terms with the associated relevance levels.

53. The system of claim 50 wherein the search engine is structured to determine the set of related terms from documents that are directly related to the initial term and from documents that have latent associations with the initial term by determining the set of related terms from documents that contain co-occurrences of the initial term and one of the related terms and from documents that contain co-occurrences of at least two of the related terms but not the initial term.

54. The system of claim 50 wherein the user interface is further structured to display each displayed portion of one or more documents that are indicated by one or more of the weighted indicators in a manner that indicates a first occurrence of the initial term.

55. The system of claim 50 wherein the search engine performs the correlation analysis of the corpus of documents relative to the initial term using Latent Semantic Regression.

56. The system of claim 50 wherein the plurality of terms displayed in the document includes hyper-linked terms and non-hyperlinked terms.

57. The system of claim 56 wherein the initial term includes a non-hyperlinked term.

58. The system of claim 50 wherein each term comprises one or more words, phrases, documents, figures, and objects.

59. The system of claim 50 wherein the navigation tool displays the determined number of the received related terms in an area separate from the document such as a menu, a list, or other graphical presentation.

60. The system of claim 50 wherein the network is the Internet.

61. The system of claim 50 wherein the corpus of documents includes web pages.

* * * * *